(12) United States Patent
Svensson

(10) Patent No.: US 11,498,205 B2
(45) Date of Patent: Nov. 15, 2022

(54) ALL WHEEL DRIVE ROBOTIC VEHICLE WITH STEERING BRAKE

(71) Applicant: HUSQVARNA AB, Huskvarna (SE)

(72) Inventor: Mats Svensson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 980 days.

(21) Appl. No.: 16/317,244

(22) PCT Filed: Jul. 11, 2017

(86) PCT No.: PCT/SE2017/050773
§ 371 (c)(1),
(2) Date: Jan. 11, 2019

(87) PCT Pub. No.: WO2018/013045
PCT Pub. Date: Jan. 18, 2018

(65) Prior Publication Data
US 2019/0299398 A1    Oct. 3, 2019

(30) Foreign Application Priority Data

Jul. 12, 2016   (SE) .................................... 1651047-1

(51) Int. Cl.
*B60L 7/24*       (2006.01)
*B25J 9/00*       (2006.01)
(Continued)

(52) U.S. Cl.
CPC .......... *B25J 9/0021* (2013.01); *A01D 34/008* (2013.01); *A01D 34/86* (2013.01); *B25J 9/162* (2013.01);
(Continued)

(58) Field of Classification Search
CPC ........ B25J 9/0021; B25J 9/162; B25J 9/1661; B25J 11/008; B60L 7/24
(Continued)

(56) References Cited

U.S. PATENT DOCUMENTS 2,451,589 A   10/1948  Thomas
3,128,840 A    4/1964  Barrett, Jr.
(Continued)

FOREIGN PATENT DOCUMENTS

CN   201938070 U    8/2011
CN   202077380 U   12/2011
(Continued)

OTHER PUBLICATIONS

International Search Report and Written Opinion for International Application No. PCT/SE2017/050773 dated Oct. 10, 2017.
(Continued)

*Primary Examiner* — Dalena Tran
(74) *Attorney, Agent, or Firm* — Burr & Forman LLP

(57) ABSTRACT

A robotic vehicle (10) comprising a first chassis platform (200) comprising a first wheel assembly (202) and a second chassis platform (210) comprising a second wheel assembly (212). The first and second chassis platforms (200, 210) is arranged to be spaced apart from each other. The robotic vehicle (10) further comprises a linkage (220) operably coupled to the first chassis platform (200) and the second chassis platform (210). The linkage (220) being coupled so as to be fixed relative to the first chassis platform (200) and so that the second chassis platform (210) is rotatable relative to the first chassis platform (200), wherein the second chassis platform (210) comprises a turning axis (400). Said robotic vehicle (10) further comprising an electric brake (262) disposed proximate to a turning shaft (422) of the linkage (220). The electric brake (262) being selectively applied by processing circuitry (110) to resist turning of the second chassis platform (210) about the turning axis (400) and being selectively released to allow the second chassis platform (210) to turn about the turning axis (400).

23 Claims, 19 Drawing Sheets

(51) Int. Cl.
*B25J 9/16* (2006.01)
*B25J 11/00* (2006.01)
*A01D 34/86* (2006.01)
*B62D 11/04* (2006.01)
*A01D 34/00* (2006.01)
*B62D 7/02* (2006.01)

(52) U.S. Cl.
CPC ........... *B25J 9/1661* (2013.01); *B25J 11/008* (2013.01); *B60L 7/24* (2013.01); *B62D 7/023* (2013.01); *B62D 11/04* (2013.01)

(58) Field of Classification Search
USPC ................ 180/204; 701/22, 70; 188/158
See application file for complete search history.

(56) References Cited

U.S. PATENT DOCUMENTS

| | | | |
|---|---|---|---|
| 3,273,664 | A | 9/1966 | Ramer |
| 3,415,335 | A | 12/1968 | Wise |
| 3,426,720 | A | 2/1969 | Enos |
| 3,550,714 | A | 12/1970 | Bellinger |
| 3,566,988 | A | 3/1971 | Wise |
| 4,079,955 | A | 3/1978 | Thorpe et al. |
| 4,318,266 | A | 3/1982 | Taube |
| 4,469,347 | A | 9/1984 | Gier |
| 4,545,453 | A | 10/1985 | Yoshimura et al. |
| 5,711,139 | A | 1/1998 | Swanson |
| 6,046,565 | A | 4/2000 | Throne |
| 6,089,341 | A | 7/2000 | Gingerich |
| 7,047,712 | B1 | 5/2006 | Hunt et al. |
| 7,631,714 | B2 | 12/2009 | Dower |
| 7,784,812 | B1 | 8/2010 | Lares |
| 9,043,953 | B2 | 6/2015 | Sandin et al. |
| 9,085,302 | B2 | 7/2015 | Borroni-Bird et al. |
| 9,258,942 | B2 | 2/2016 | Biber et al. |
| 9,267,245 | B1 | 2/2016 | Braun |
| 9,321,306 | B2 * | 4/2016 | Outa ..................... B62D 39/00 |
| 9,403,566 | B2 | 8/2016 | Jacobsen et al. |
| 10,988,033 | B2 * | 4/2021 | Monkhouse ........... B60L 50/51 |
| 2003/0144774 | A1 | 7/2003 | Trissei et al. |
| 2005/0029025 | A1 | 2/2005 | Medina |
| 2007/0205029 | A1 * | 9/2007 | Leone ................. F02D 41/0275 903/906 |
| 2010/0084230 | A1 | 4/2010 | Yamasaki et al. |
| 2012/0161497 | A1 * | 6/2012 | He .......................... B60L 50/30 301/6.5 |
| 2012/0273284 | A1 | 11/2012 | Nesnas et al. |
| 2013/0333342 | A1 | 12/2013 | Keski-Luopa et al. |
| 2014/0354096 | A1 | 12/2014 | Eriksen |
| 2015/0185733 | A1 | 7/2015 | Jagenstedt et al. |
| 2015/0201555 | A1 | 7/2015 | Wilgert |
| 2019/0357433 | A1 | 11/2019 | Fuse et al. |
| 2019/0378360 | A1 | 12/2019 | Bergenholm et al. |

FOREIGN PATENT DOCUMENTS

| | | |
|---|---|---|
| CN | 103283376 A | 9/2013 |
| CN | 203482619 U | 3/2014 |
| EP | 0 716 974 A1 | 6/1996 |
| EP | 2 073 088 B1 | 6/2011 |
| EP | 2869688 B1 | 4/2018 |
| FR | 3 022 209 A1 | 12/2015 |
| JP | H09-37610 A | 2/1997 |
| JP | 2015-168395 A | 9/2015 |
| JP | 2016-148937 A | 8/2016 |
| JP | 5973608 B1 | 8/2016 |
| JP | 5973609 B1 | 8/2016 |
| JP | 5973610 B1 | 8/2016 |
| JP | 6014182 B2 | 10/2016 |
| WO | 90/04821 A1 | 5/1990 |
| WO | 96/02454 A1 | 2/1996 |
| WO | 02/36412 A1 | 5/2002 |
| WO | 02/45915 A1 | 6/2002 |
| WO | 2014/007729 A1 | 1/2014 |
| WO | 2015/115954 A1 | 8/2015 |
| WO | 2016/087998 A2 | 6/2016 |
| WO | 2016/097896 A1 | 6/2016 |
| WO | 2016/102146 A1 | 6/2016 |
| WO | 2016/103070 A1 | 6/2016 |
| WO | 2016/150510 A1 | 9/2016 |

OTHER PUBLICATIONS

International Search Report and Written Opinion for International Application No. PCT/IB2015/059129 dated May 30, 2016.
International Preliminary Report on Patentability for International Application No. PCT/IB2015/059129 dated Jun. 6, 2017.
Xuyong Tu, "Robust navigation control and headland turning optimization of agricultural vehicles", 2013, page No. 27, http://lib.dr.iastate.edu/cgi/viewcontent.cgi?article=4195&context=etd, all enclosed pages cited, date is not available.
International Preliminary Report on Patentability for International Application No. PCT/SE2017/050773 dated Jan. 15, 2019.
Ambrogio Robot, "L60 B", http://www.ambrogiorobot.com/en/models/view/l60-b, Nov. 15, 2016, all enclosed pages cited.
Ambrogio Robot, "L200R B", http://www.ambrogiorobot.com/en/models/view/l200r-b, Nov. 15, 2016, all enclosed pages cited.
Flymo, "Flymo Robotic Lawnmower 1200R", http://www.flymo.com/uk/lawn-mowers/robotic/1200r/, Nov. 15, 2016, all enclosed pages cited.

* cited by examiner

ALL WHEEL DRIVE ROBOTIC VEHICLE WITH STEERING BRAKE

TECHNICAL FIELD

The present invention relates to a robotic vehicle. More particularly, it relates to a robotic vehicle with a steering brake.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Robotic mowers are typically capable of transiting over even and uneven terrain to execute yard maintenance activities relating to mowing. In order to further strengthen the operational performance it would be advantageous to provide solutions which improve their utility and functionality even in more challenging terrain.

SUMMARY

It should be appreciated that example embodiments may be employed on numerous other robotic vehicles, so the robotic mower should be recognized as merely one example of such a vehicle.

It is an object of present invention to provide a robotic vehicle with means to minimize self steering when facing challenging terrain. It is a further object of the invention to provide a more stable robotic vehicle even in challenging terrains.

According to an embodiment the robotic vehicle comprises a first and second chassis platform being operably coupled via a linkage. The linkage may be fixed relative the first chassis platform and rotatably coupled to the second chassis platform, whereby the second chassis platform comprises a turning axis. The robotic vehicle also comprises a processing circuitry configured to control an electric brake being selectively applied by said processing circuitry. Said brake is preferably disposed proximate to a turning shaft of the linkage and may be selectively released to allow the second chassis platform to turn about the turning axis.

Preferably the robotic vehicle is configured to operate in a first or a second mode. In the first mode the electric brake is configured to unlock the linkage, thus allowing for rotation of the second chassis platform about the turning axis. In the second mode the electric brake is configured to lock the linkage, thus preventing rotation of the second chassis platform about the turning axis. In such embodiment the processing circuitry is configured to obtain information of an initial turning indicator. The initial turning indicator is indicative of a change from an initial travelling direction of the robotic vehicle. The processing circuitry may be further configured to switch operating mode upon obtaining information of the initial turning indicator.

According to one embodiment the processing circuitry may be configured to upon obtaining the initial turning indicator switch operating mode for the robotic vehicle from the second mode to the first mode. The first mode may be a turning mode and the second mode a straight traveling mode. Preferably, the electronic brake is deenergized when applied and energized when released. The electric brake will be applied, or locked, whenever the robotic vehicle is travelling in an intended direction. Thus, the brake will only be energized when an initial turning indicator is obtained, leading to a lower energy consumption. Advantageously, the initial turning indicator may in such an embodiment be obtained from a turning instruction to be executed by the robotic vehicle.

According to another embodiment the processing circuitry may be configured to upon detection of the initial turning indicator switch operating mode for the robotic vehicle from the first mode to the second mode. The initial turning indicator may in such an embodiment be a turning indicator value indicative of a deviation from an initial travelling direction. The turning indicator value may be detected by a sensor in communication with the processing circuitry.

BRIEF DESCRIPTION OF DRAWINGS

Reference will now be made to the accompanying drawings, which are not necessarily drawn to scale, and wherein:

FIG. 2, which includes

FIG. 3, which includes

FIG. 4, which includes

FIG. 8, which includes

DETAILED DESCRIPTION

Figure 1:
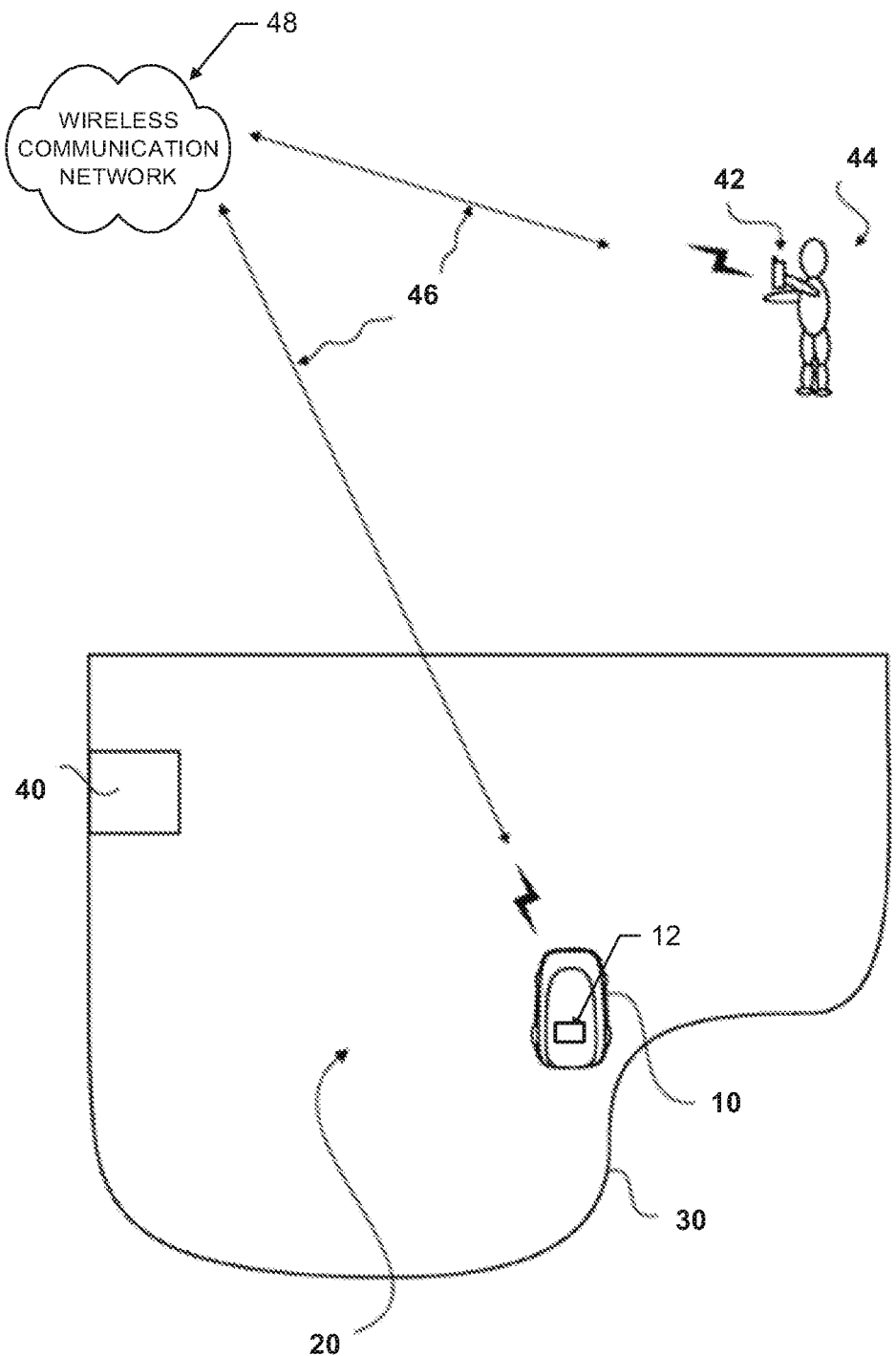
FIG. 1 illustrates an example operating environment for a robotic mower that may employ an example embodiment.

Robotic vehicles, such as robotic mowers, are generally expected to run autonomously over a defined area and perform a function (e.g., mowing). In the simplest of environments, where the area is relatively small and flat, with a somewhat regular shape, the robotic vehicle may be able to traverse the area with ease. However, when designing and building robotic vehicles, such vehicles must be designed for the worst case scenario and not the simplest in order to ensure that the final product can be successful in the marketplace. Thus, maneuverability in all sorts of environments (e.g., hilly terrain, narrow paths, complex shaped areas, etc.) can be an important feature of such devices.

One aspect of maneuverability that can be helpful for robotic vehicles configured to operate in challenging environments is the ability to make small radius turns. Providing a robotic vehicle that can turn at or near a turning angle of about 90 degrees can be a significant advantage. However, whether turning on slopes or sharply, it may be possible to tear up grass or even tip the robotic vehicle over in some situations. Thus, simply providing a robotic vehicle with sharp turning capabilities is not necessarily the end of the issue. A robotic vehicle with sharp turning capabilities should be controlled in a manner that intelligently employs its capabilities to avoid damaging grass and/or the vehicle itself.

In order to achieve small radius turns the robotic vehicle may be an articulated robotic vehicle. An articulated robotic vehicle may comprise two chassis platforms coupled together by a coupling or linkage. By having one of the chassis platforms steerable in relation to other, the robotic vehicle can be adapted to have a lesser turning radius and being capable of performing sharper turns.

However, when facing more challenging terrains an articulated robotic vehicle may in some scenarios start self-steering or being unstable. Such scenarios may include for example self-steering on small pits which results in unintentional curved movement of the robotic vehicle.

In some instances, such as steep slopes or uneven surfaces the rear chassis and wheels may be unstable, e.g. self steer, if a free bearing between the two chassis platforms is employed. A brake may be used when the mower is driving straight forward or backward, or when the mower is executing a turn. According to some of the embodiments described herein an electromagnetic brake, such as an electropermanent magnet, is used. The electric brake may be released when the mower is changing the actual turn angle and applied, or engaged, when the desired turn angle, including straight driving direction, is achieved, thus limiting or preventing unintentional turning of the mower during operation. In another embodiment the electric brake may be applied, or engaged, when the mower is changing its actual turning angle, such that the actual turning angle differs from the desired turning angle, and released when the actual turning angle is steady. In such embodiment unstable behavior of the robotic vehicle is greatly reduced. Example embodiments are therefore described herein to provide various structural and control-related design features that can be employed to improve the capabilities of robotic vehicles (e.g., robotic mowers, mobile sensing devices, watering devices and/or the like) to be expanded and employed in an intelligent manner. Other structures may also be provided and other functions may also be performed as described in greater detail below.

FIG. 1 illustrates an example operating environment for a robotic mower 10 that may be employed in connection with an example embodiment. However, it should be appreciated that the example embodiments may be employed on numerous other robotic vehicles, so the robotic mower 10 should be recognized as merely one example of such a vehicle. The robotic mower 10 may operate to cut grass on a parcel 20 (i.e., a land lot or garden), the boundary 30 of which may be defined using one or more physical boundaries (e.g., a fence, wall, curb and/or the like), a boundary wire, programmed location based boundaries or combinations thereof. When the boundary 30 is a boundary wire, the boundary wire may emit electrical signals that are detectable by the robotic mower 10 to inform the robotic mower 10 when the boundary 30 of the parcel 20 has been reached.

The robotic mower 10 may be controlled, at least in part, via control circuitry 12 located onboard. The control circuitry 12 may include, among other things, a positioning module and a sensor module, which will be described in greater detail below. Accordingly, the robotic mower 10 may utilize the control circuitry 12 to define a path for coverage of the parcel 20 in terms of performing a task over specified portions or the entire parcel 20. In this regard, the positioning module may be used to guide the robotic mower 10 over the parcel 20 and to ensure that full coverage (of at least predetermined portions of the parcel 20) is obtained, while the sensor module may detect objects and/or gather data regarding the surroundings of the robotic mower 10 while the parcel 20 is traversed.

If a sensor module is employed, the sensor module may include a sensors related to positional determination (e.g., a boundary wired detector, a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors may be used, at least in part, for determining the location of the robotic mower 10 relative to boundaries or other points of interest (e.g., a starting point or other key features) of the parcel 20, or determining a position history or track of the robotic mower 10 over time. The sensors may also detect collision, tipping over, or various fault conditions. In some cases, the sensors may also or alternatively collect data regarding various measurable parameters (e.g., moisture, temperature, soil conditions, etc.) associated with particular locations on the parcel 20. Further, in some cases, the sensors may be used to detect slope and/or traction impacting conditions along with the amount of or angle of turn being attempted by the robotic vehicle. As will be discussed below, the robotic mower 10 may be configured to control the turn angle based on various factors to optimize turning capabilities while minimizing any risks associated with engaging in large angle turns in certain conditions or circumstances.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry 12 in a manner that enables the robotic mower 10 to systematically traverse the parcel while operating a cutting blade to cut the grass on the parcel 20. In cases where the robotic vehicle is not a mower, the control circuitry 12 may be configured to control another functional or working assembly that may replace the blade control system.

In some embodiments, the control circuitry 12 and/or a communication node at the charge station 40 may be configured to communicate wirelessly with an electronic device 42 (e.g., a personal computer, a cloud based computer, server, mobile telephone, PDA, tablet, smart phone, and/or the like) of a remote operator 44 (or user) via wireless links 46 associated with a wireless communication network 48. The wireless communication network 48 may provide operable coupling between the remote operator 44 and the robotic mower 10 via the electronic device 42, which may act as a remote control device for the robotic mower 10 or may receive data indicative or related to the operation of the robotic mower 10. However, it should be appreciated that the wireless communication network 48 may include additional or internal components that facilitate the communication links and protocols employed. Thus, some portions of the wireless communication network 48 may employ additional components and connections that may be wired and/or wireless. For example, the charge station 40 may have a wired connection to a computer or server that is connected to the wireless communication network 48, which may then wirelessly connect to the electronic device 42. As another example, the robotic mower 10 may wirelessly connect to the wireless communication network 48 (directly or indirectly) and a wired connection may be established between one or more servers of the wireless communication network 48 and a PC of the remote operator 44. In some embodiments, the wireless communication network 48 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases. Accordingly, communication between the wireless communication network 48 and the devices or databases (e.g., servers, electronic device 42, control circuitry 12) may be accomplished by either wireline or wireless communication mechanisms and corresponding protocols.

Figure 2A:
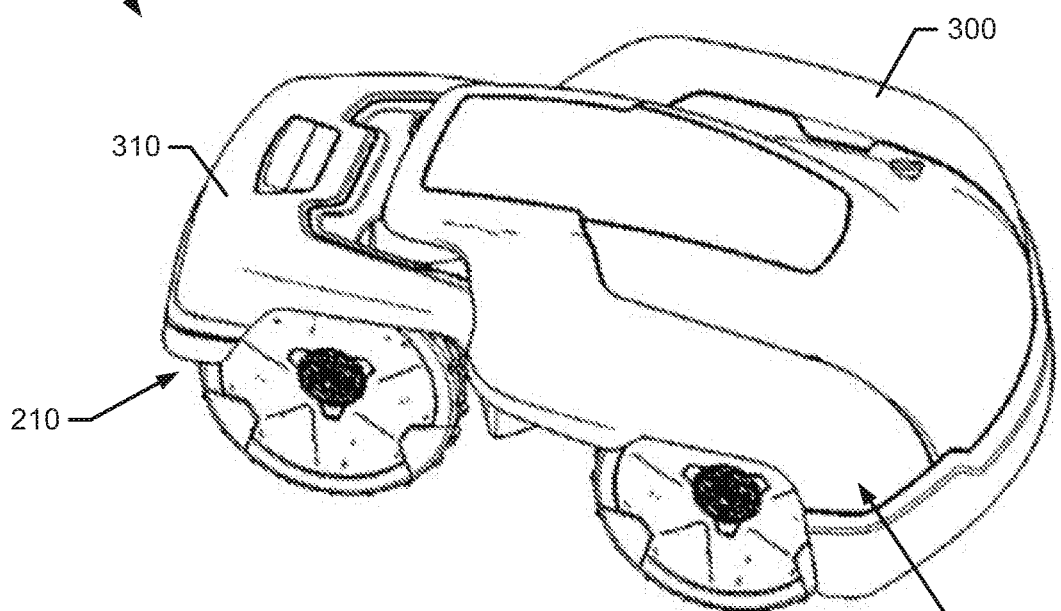
FIGS. 2A and 2B, illustrates a perspective view of the robotic mower in accordance with an example embodiment.
Figure 2B:
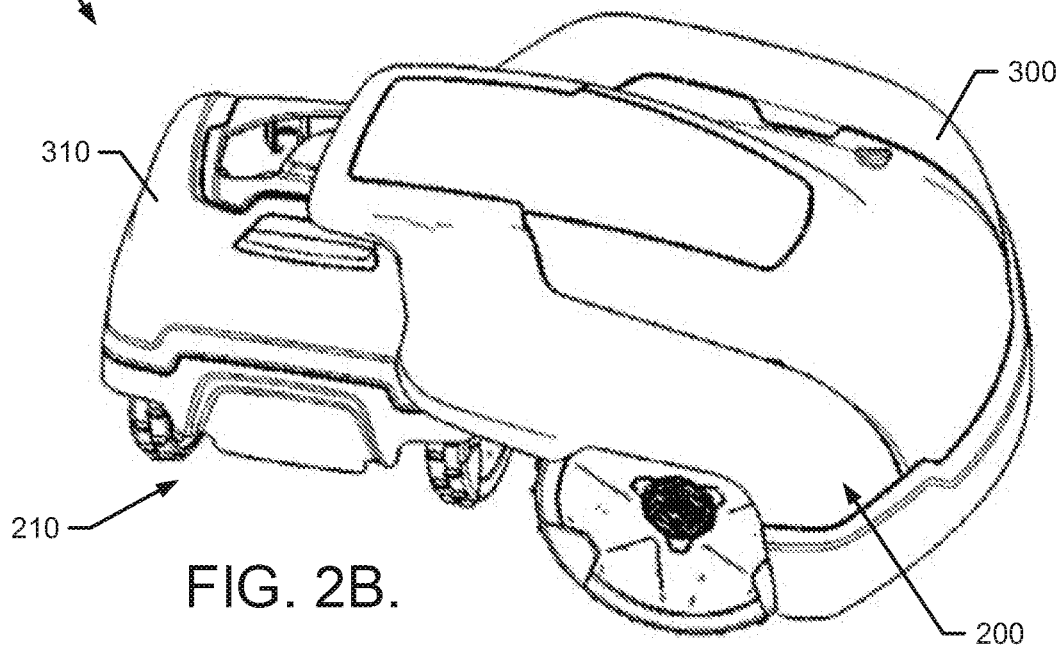

FIG. 2, which includes FIGS. 2A and 2B, illustrates a perspective view of a robotic mower 10 in accordance with one example embodiment. In this regard, FIG. 2A shows the robotic mower 10 being steered for straight ahead driving, while FIG. 2B shows the robotic mower 10 executing a turn. In the example of FIG. 2, the robotic mower is shown having a first housing 300 covering the first chassis platform 200 and a second housing 310 covering the second chassis platform 210. The housings shown in FIG. 2 are merely exemplary, however, and should not be seen as being limiting in any way. That said, it may be desirable to keep the linkage 220 covered or out of view, and so the first housing 300 is shown in this example to cover over the linkage 220 and also cover at least a portion of the second housing 310. As such, the first housing 300 may remain fixed in its relationship or orientation relative to the linkage 220 (even during a turn), but the second housing 310 may vary its orientation relative to the first housing 300 and the linkage 220 during a turn.

Figure 3A:
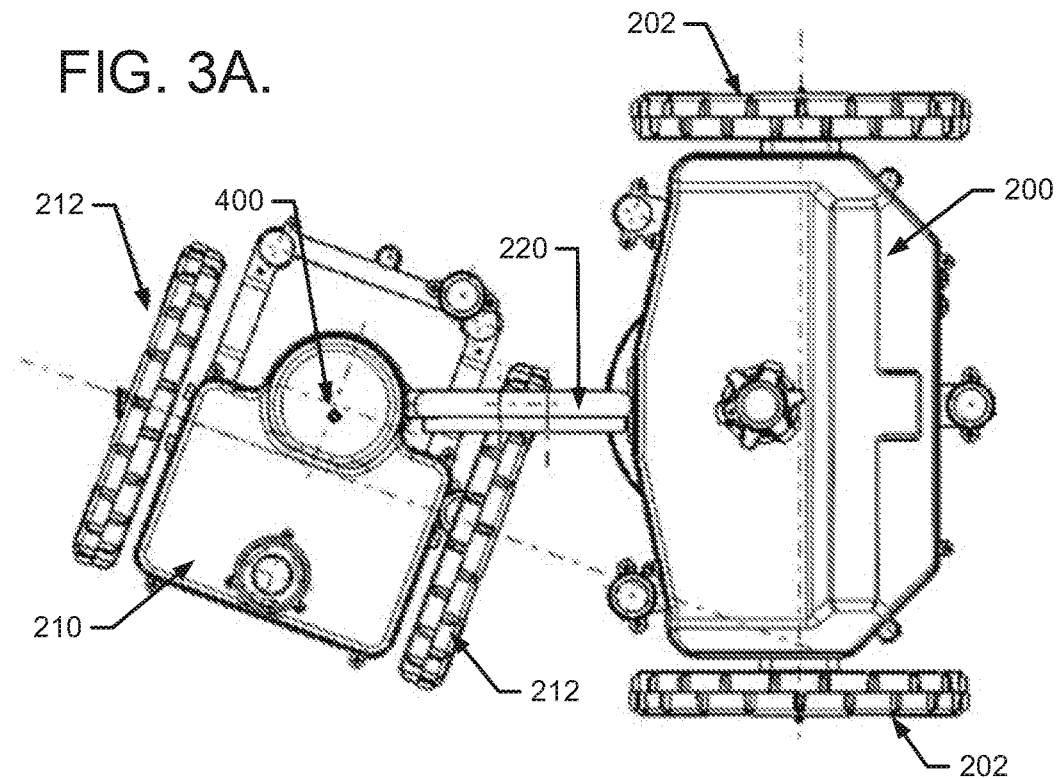
FIGS. 3A and 3B, illustrates various views of the robotic mower with the first and second housing portions removed to show a turning capability of one example embodiment that has a curved combination linkage between chassis platforms.
Figure 3B:
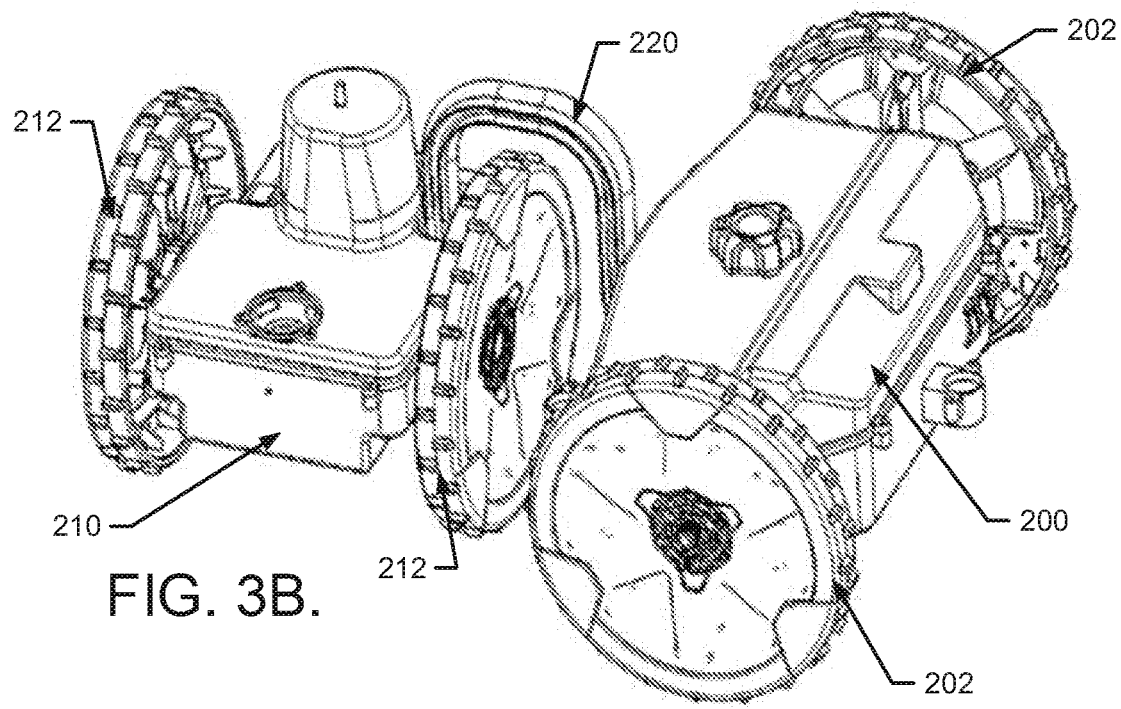

FIGS. 3 and 4 show two different example structures for employing the linkage 220. In this regard, FIG. 3, which includes FIGS. 3A and 3B, illustrates a top view (FIG. 3A) and a perspective view (FIG. 3B) of the robotic mower 10 with the first and second housing portions removed. In FIG. 3, the linkage 220 is embodied as a curved member having a C-shape or U-shape that provides a large clearance to enable either of the wheels of the second wheel assembly 212 to freely pass under the linkage 220.

Figure 4A:
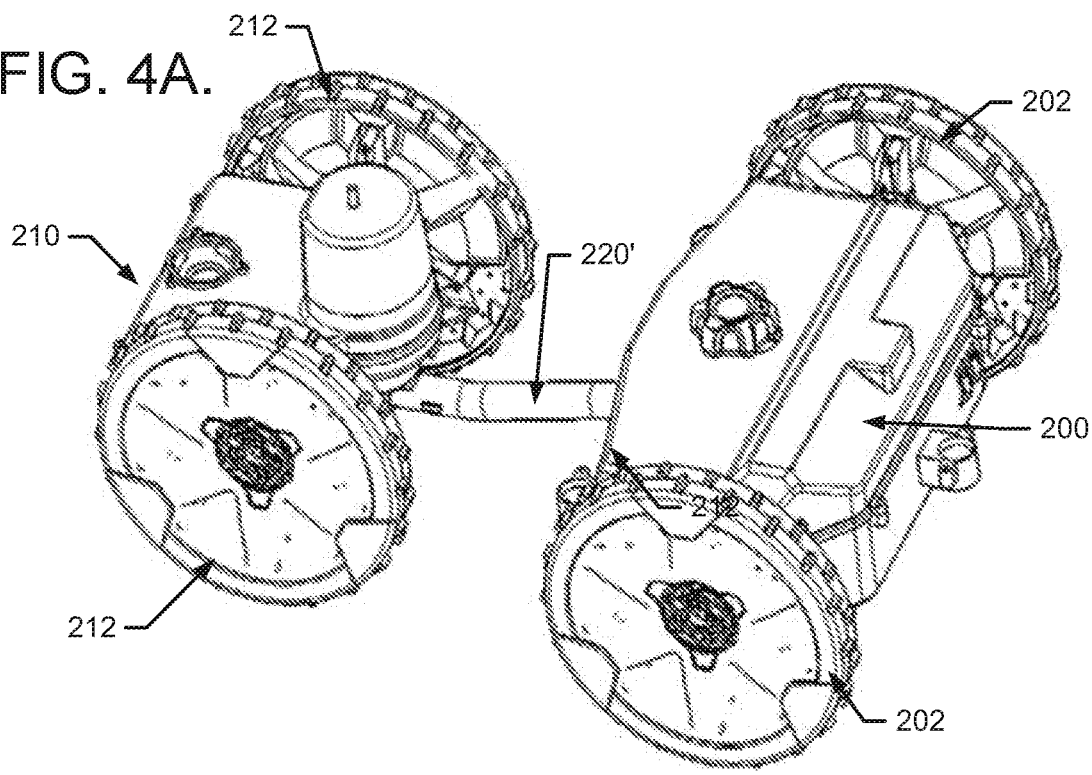
FIGS. 4A and 4B, illustrates various views of the robotic mower with the first and second housing portions removed to show a turning capability of one example embodiment that has a straight combination linkage between chassis platforms.
Figure 4B:
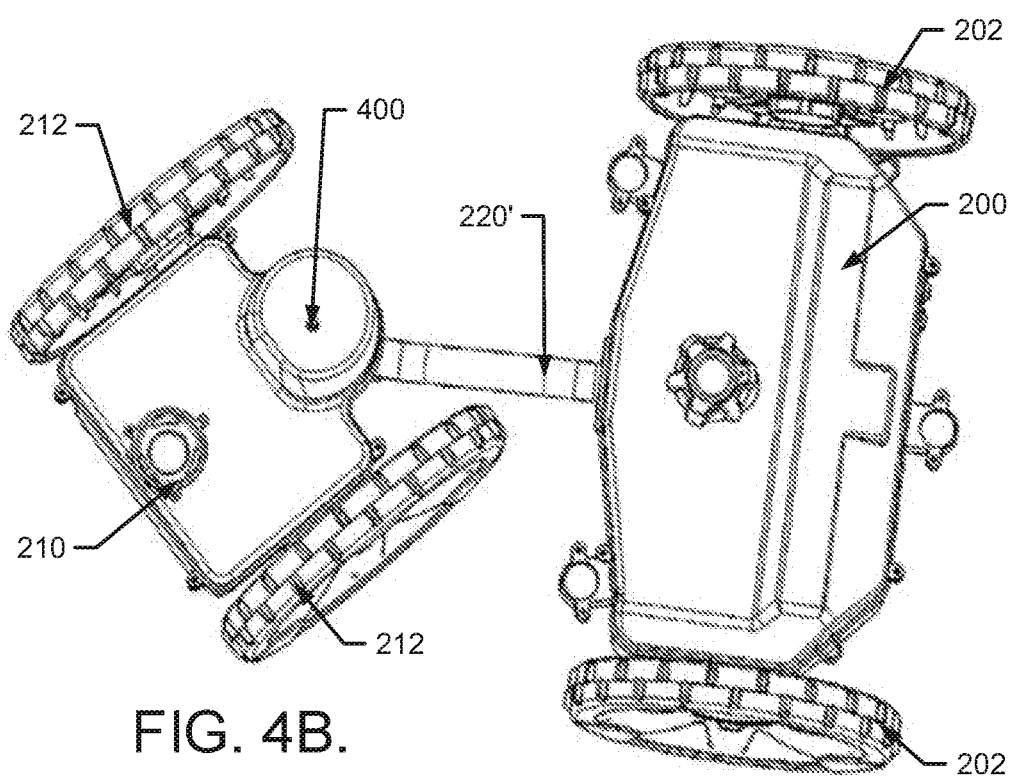

Meanwhile, FIG. 4, which includes FIGS. 4A and 4B, illustrates a perspective view (FIG. 4A) and a top view (FIG. 4B) of the robotic mower 10 with the first and second housing portions removed to show an alternative linkage 220' design. In FIG. 4, the linkage 220' is embodied as a relatively straight member that does not provide clearance to enable either of the wheels of the second wheel assembly 212 to freely pass under the linkage 220'. Thus, the turn radius is somewhat limited for this example.

Referring to FIG. 3, the linkage 220 of this example has a fixed connection to the first chassis platform 200. As such, the linkage 220 extends rearward from the first chassis platform 200 toward the second chassis platform 210 along the longitudinal centerline of the robotic mower 10. The linkage 220 remains fixed in this orientation relative to the first chassis platform 200. However, the orientation of the linkage 220 relative to the second chassis platform 210 is variable based on the turning status of the robotic mower 10. When the robotic mower 10 is driving straight ahead, each of the wheel assemblies (202 and 212) may receive equal drive power to each wheel. However, when turning, at least some of the wheels may receive drive power unequally (e.g., at differing speeds and/or directions). When turning, the second chassis platform 210 may therefore begin to rotate about a turning axis 400.

As shown in FIG. 3B, the linkage 220 has a C-shape or U-shape that may be formed by respective lift arms that are proximate to the first chassis platform 200 and the second chassis platform 210 respectively. The lift arms may extend upward, substantially parallel to each other and substantially perpendicular to the longitudinal centerline of the robotic mower 10 (normal to the surface of the ground). Meanwhile, a cross-arm may extend between the lift arms to form the base of the C or U inverted relative to the ground (so the open side of the C or U shape points downward). The cross-arm may be substantially perpendicular to each of the lift arms, and parallel to the ground. Each wheel of the second wheel assembly 212 may have a diameter that is less than the height of the cross-arm relative to the ground. Thus, each wheel of the second wheel assembly 212 may be enabled to pass underneath the cross-arm during a turn as shown in FIG. 3B. Thus, for example, either of the wheels of the second wheel assembly 212 may pass between the first chassis platform 200 and the second chassis platform 210. This arrangement enables sharp turns (e.g., 90 degree turns) to be achievable via the robotic mower 10.

Moreover, while the common axis of the first wheel assembly 202 is maintained substantially perpendicular to the longitudinal centerline of the robotic mower 10, the common axis of the second wheel assembly 212 is variable and can move between being substantially perpendicular to the longitudinal centerline of the robotic mower 10 and being substantially parallel to the longitudinal centerline of the robotic mower 10 (and past these limits in some cases).

In order to lock the first chassis platform 200 and second chassis platform 210 in relation to each other an electric brake may be implemented. Such electric brake may be of any type capable of locking a rotational coupling.

Figure 5A:
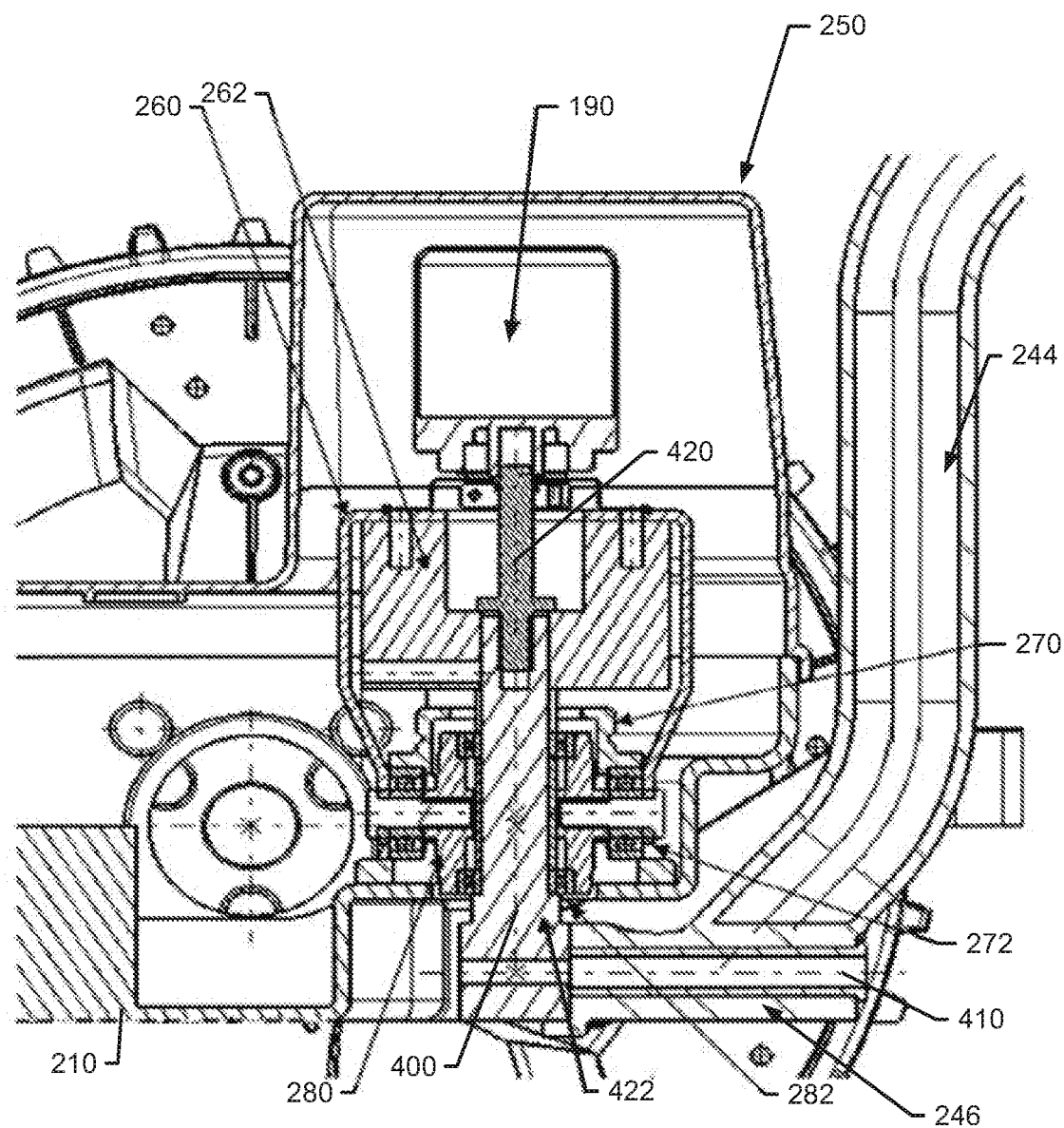
FIG. 5A illustrates a cross section view of the turn assembly to facilitate a description of how the rotation about the turning axis and pivot axis may be accomplished in accordance with one example embodiment.

FIG. 5A illustrates a cross section view of a turn assembly 250 comprising the turning axis 400 and turning shaft 420 around which the second chassis platform 210 is rotatable. The electric brake may according to some examples be situated proximate to the turning shaft 420. In some cases, the electric brake may be capable of directly locking the turning shaft 420.

FIGS. 5B-G show alternative examples of electric brakes applicable to the present robotic vehicle 10.

Figure 5B:
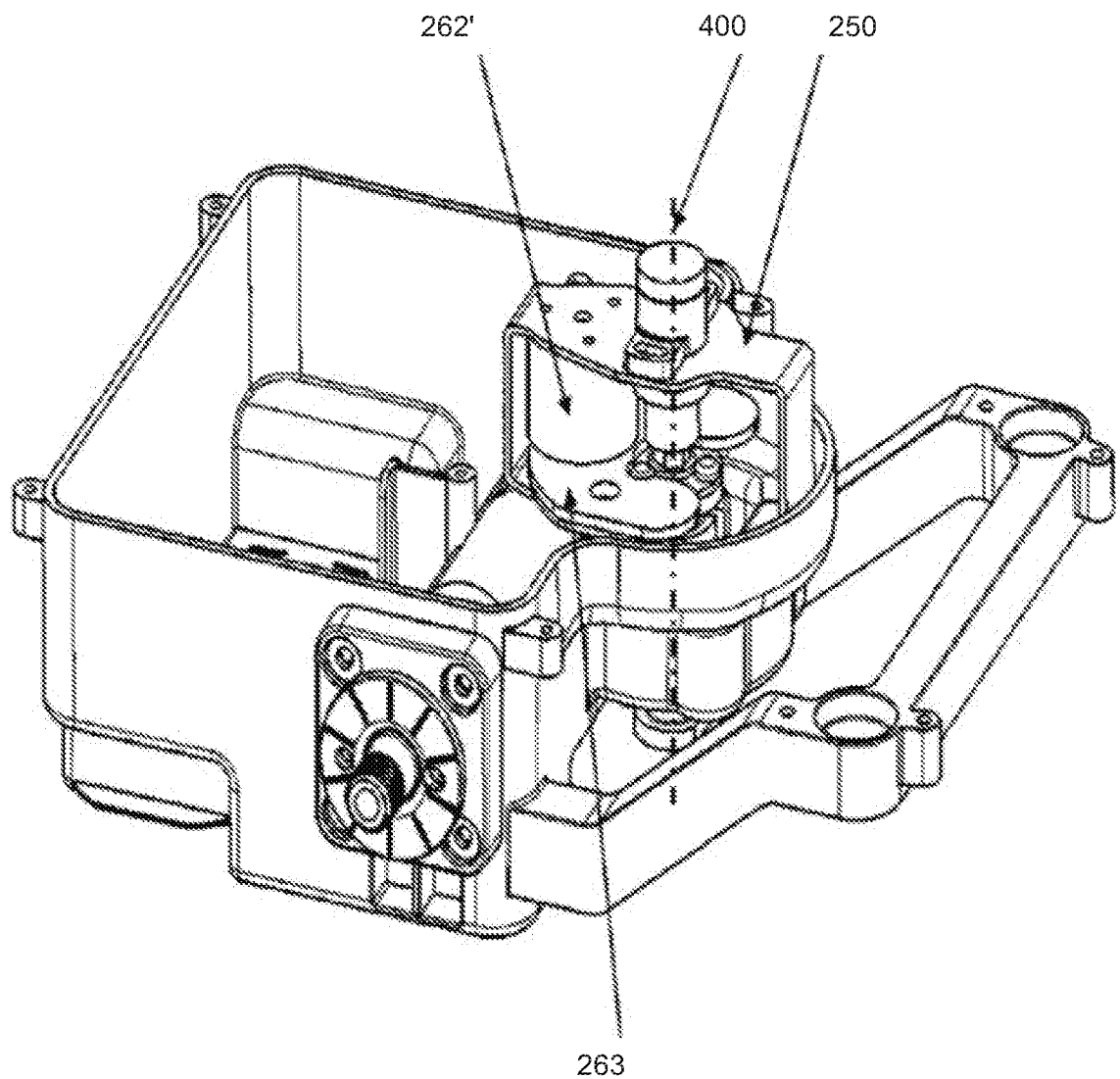
FIG. 5B illustrates a perspective view of a turn assembly in accordance with an example embodiment.

FIG. 5B illustrates a perspective view of the turn assembly 250 in accordance with one example embodiment. The electric brake 262 may include an electromagnet 262' and a brake disc 263. The electromagnet 262' may rotate about the turning axis 400 with the second chassis platform 210. The brake disc 263 may be stationary relative to the turning axis 400 and extend around the turning axis to at least the maximum turning direction, for example at least 180 degrees.

Figure 5C:
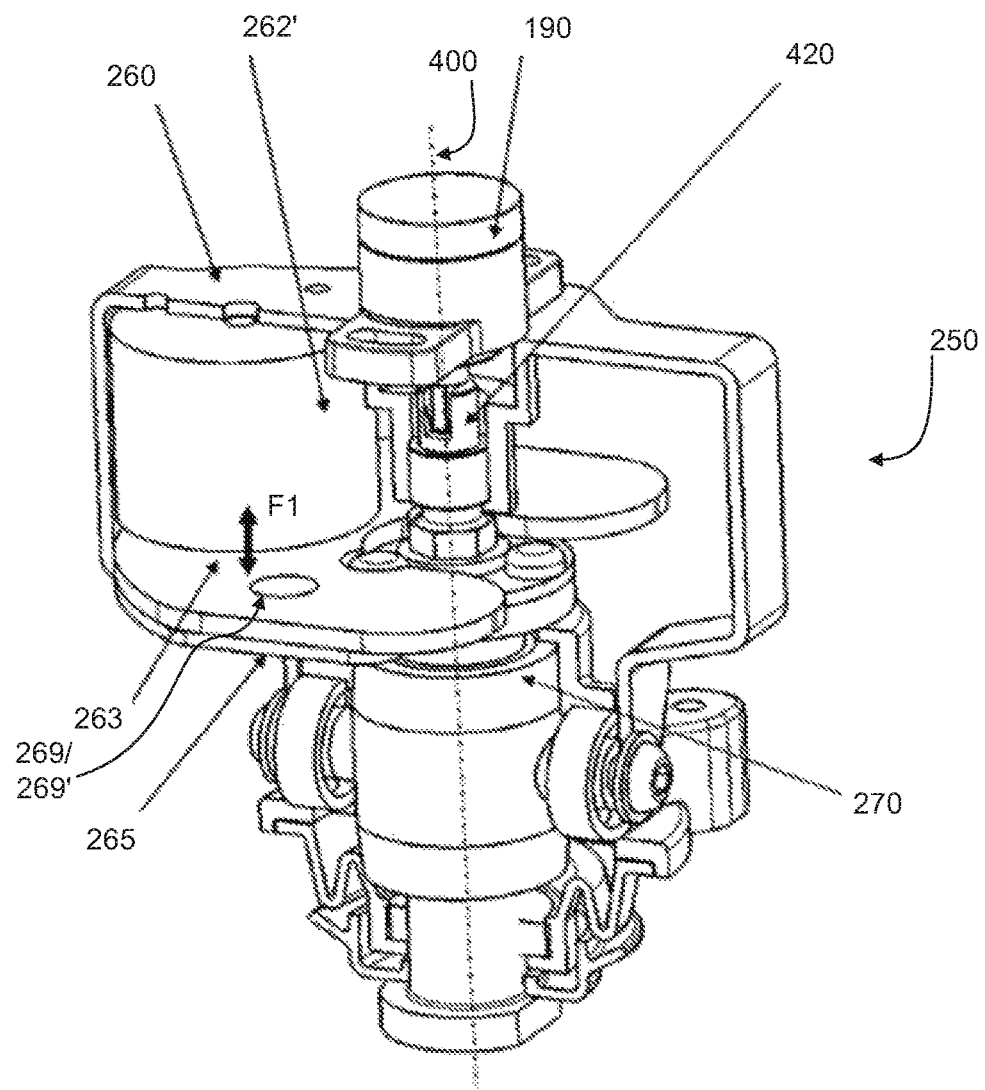
FIG. 5C illustrates a perspective view of an electric brake in accordance with an example embodiment.

FIG. 5C illustrates a perspective view of the electric brake and turn assembly in accordance with an example embodiment. The electromagnet 262' may be operably coupled, e.g. riveted, screwed, welded, or the like, to fixed mount 260. The fixed mount 260 may be operably coupled to the second chassis platform 210, such that the fixed mount and electromagnet 262' may turn in response to the turning of the second mounting chassis platform. The brake disc 263 may be operably coupled to a disc mounting plate 265. The disc mounting plate 265 may be operable coupled to the pivot 270, such that the disc mounting plate 265 and brake disc 263 are stationary relative to the turning axis 400.

In one example embodiment, the brake disc 269 may include a guide, such as a guide rod 269 and aperture 269'. The guide rod 269 may extend from the disc mounting plate 265 through the aperture 269' allowing brake disc 263 to move toward and away from the electromagnet 262', while being stationary relative the turning axis 400, as depicted by arrow F1. In some example embodiments, the guide rod 269 penetrates the aperture 269' but does not penetrate the brake plane, e.g. the surface of the brake disc 263 which faces the electromagnet 262'. The electromagnet 262' may engage the brake disc 263 at any point, e.g. as the electromagnet moves it may engage the point of the brake disc which is presently facing the electromagnet.

In an example embodiment, the electric brake 262 is an electropermanent magnet as discussed below in FIG. 5D. In some example embodiments, the electric brake 262 is a friction brake. In an instance in which the electric brake 262 is a friction brake, the electric brake may apply a brake pad to the brake disc 263 generating a frictional force sufficient to limit or prevent unintentional turning of the second chassis platform 210. In another example embodiment, the electric brake 262 may be a caliper brake. In an example embodiment in which the electric brake 262 is a caliper brake, the caliper may travel on either side of the brake disc 263 as the electric brake moves about the turning axis 400 with the second chassis platform. Actuation of the caliper may be applied by an electric motor, or servo, applying tension to the caliper which, in turn, applies force to either side of the brake disc 263. The force applied to either side of the brake disc 263 may be sufficient to limit or prevent unintentional turning of the second chassis platform 210. In further example embodiments, the electric brake 262 may be a solenoid actuated locking pin. In an example embodiment in which the electric brake 262 is a solenoid actuated locking pin, the brake disc 263 may have one or more apertures or recesses. In an instance in which the locking pin is actuated, the locking pin may engage at least one of the apertures of recesses, thereby limiting or preventing unintentional turning of the second chassis platform 210. One of ordinary skill in the art would immediately appreciate that electric brakes described herein are for illustrative purposes and other brakes beyond those disclosed may be used to provide steering stability in robotic vehicles, such as mowers.

Figure 5D:
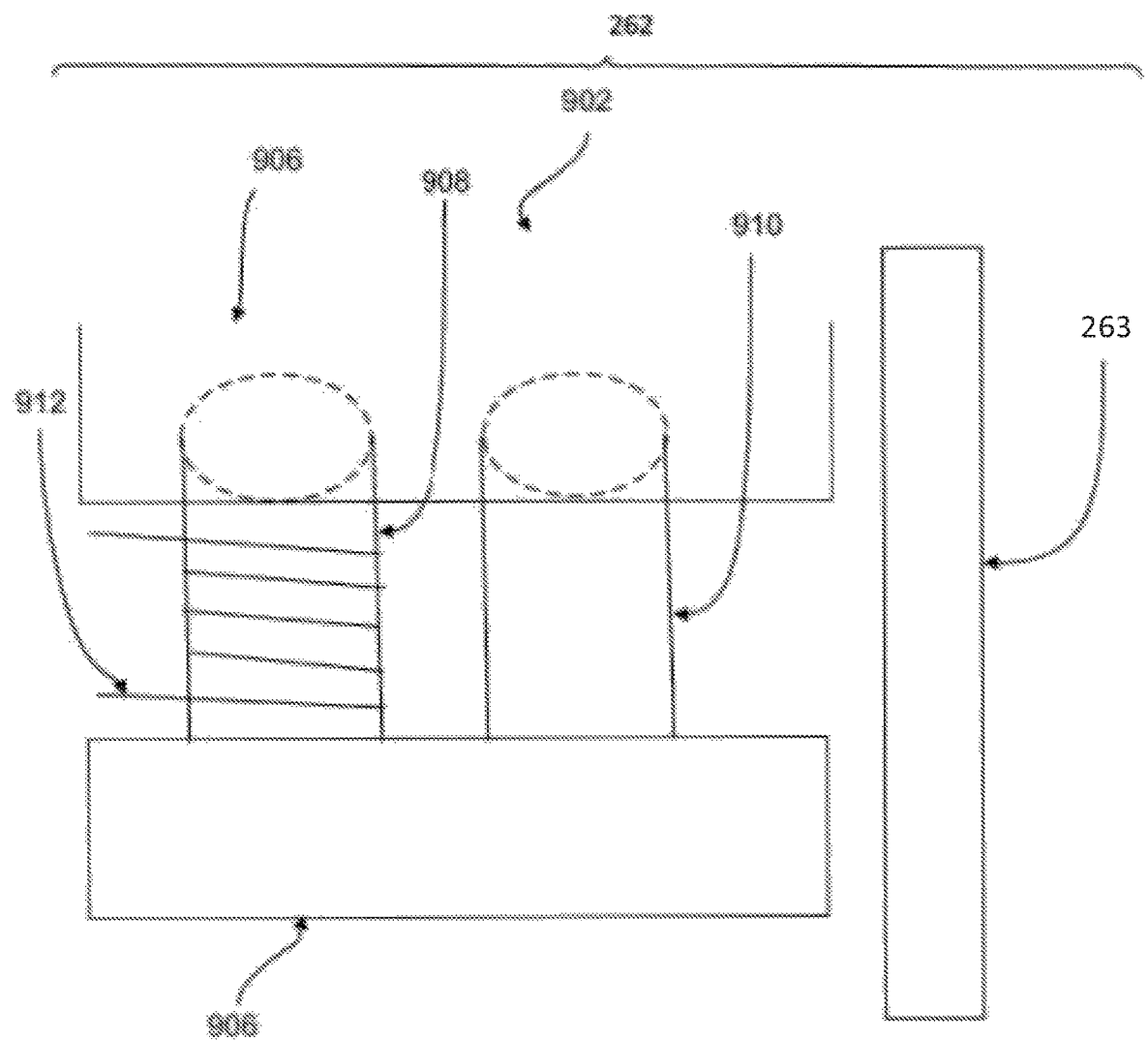
FIG. 5D illustrates a diagram of an electric brake in accordance with an example embodiment.

FIG. 5D illustrates a diagram of an electric brake 262 in accordance with an example embodiment. The electric brake 262 may include an electromagnet 902 and a brake disc 263. In an example embodiment, the electromagnet 902 may be a electropermanent magnet. The electromagnet 902 may include two plates 906, and a first permanent magnet 908, a second permanent magnet 910, and a winding 912. The first permanent magnet 908 may be a material with a relatively low intrinsic coactivity, such as 50 A/m, for example AlNiCo (Alnico). The second permanent magnet 910 may be a material with a relatively high intrinsic coercively, such as 1120 A/m, for example NdFeB (neodymium). The two plates 906 and brake disc 904 may be a soft magnet, Hiperco. The coil 912 may be wrapped around one or both permanent magnets 908, 910, and operably coupled to a power supply which may be selectively applied, such as by a solenoid operably coupled to the control circuitry 12.

The first and second permanent magnets 908, 910 may be oriented, such that the north end of each magnet is operably coupled to opposing plate 906. The plates 906 may channel the magnetic flux through the brake disc 904, causing the brake disc to be pulled and move towards the electromagnet 902. The magnetic flux channeled through the plates 906 and the brake disc 263 may apply a significant magnetic force between the electromagnet 902 and brake disc, for example 50-100 N. The magnetic force may be sufficient to limit or prevent unintentional turning of the second chassis platform 210. As described, the electric brake 262 is normally locked or applied, without a current being applied to the winding 612.

In an instance in which the control circuitry 12 determines a change in turn angle is desired, the electric brake 262 may be unlocked or released. An electric current may be applied to the winding 912, causing an electromagnetic field to be induced, opposite of the magnetic field of the first permanent magnet 908. In an example embodiment, the electric current may be continuously applied while the break is released or may be a pulse. The magnetic field of the first permanent magnet 908 may be reversed by the electromagnetic field of the winding 912, such that the north ends of the first and second permanent magnets 908, 910 are operably coupled to the same plate 908. The magnetic flux or field may be focused by the plates 906 through the air around the electromagnet 902. The brake disc 263 may move away from the electromagnet 902 due to the magnetic force and/or gravitational force, releasing the electric brake 262 and allowing turning of the second chassis platform about the turning axis 400. In some example embodiments, in an instance in which the brake is released, a gap may be provided between the brake disc 263 and the electromagnet 902 limiting or preventing wear of the brake disc 263 when as the electromagnet 902 moves about the turning axis.

In an embodiment in which the first permanent magnet 908 magnetic field is reversed by a electromagnetic field pulse induced by an application of current to the winding 912 in a first direction, the magnetic field of the permanent magnet may be reversed to the first orientation by application of current to the winding in a second direction opposite to the first direction. In an embodiment in which the magnetic field of the first permanent magnet 908 is reversed by continued application of an electromagnetic field induced by a continuous application of current to the winding 912, the magnetic field of the permanent magnet may be reversed to the first orientation by interrupting application of current to the winding. The return of the first permanent magnet 908 to an orientation opposite of the second permanent magnet may lock or apply the electric brake 262, causing the magnetic field to engage the brake disc 263, as discussed above.

Although the operation of the electropermanent magnet was as normally locked, e.g. locked when deenergized, one of ordinary skill in the art would immediately understand that the electropermanent magnet may be configured to be normally unlocked, e.g. locked when energized.

Figure 9A:
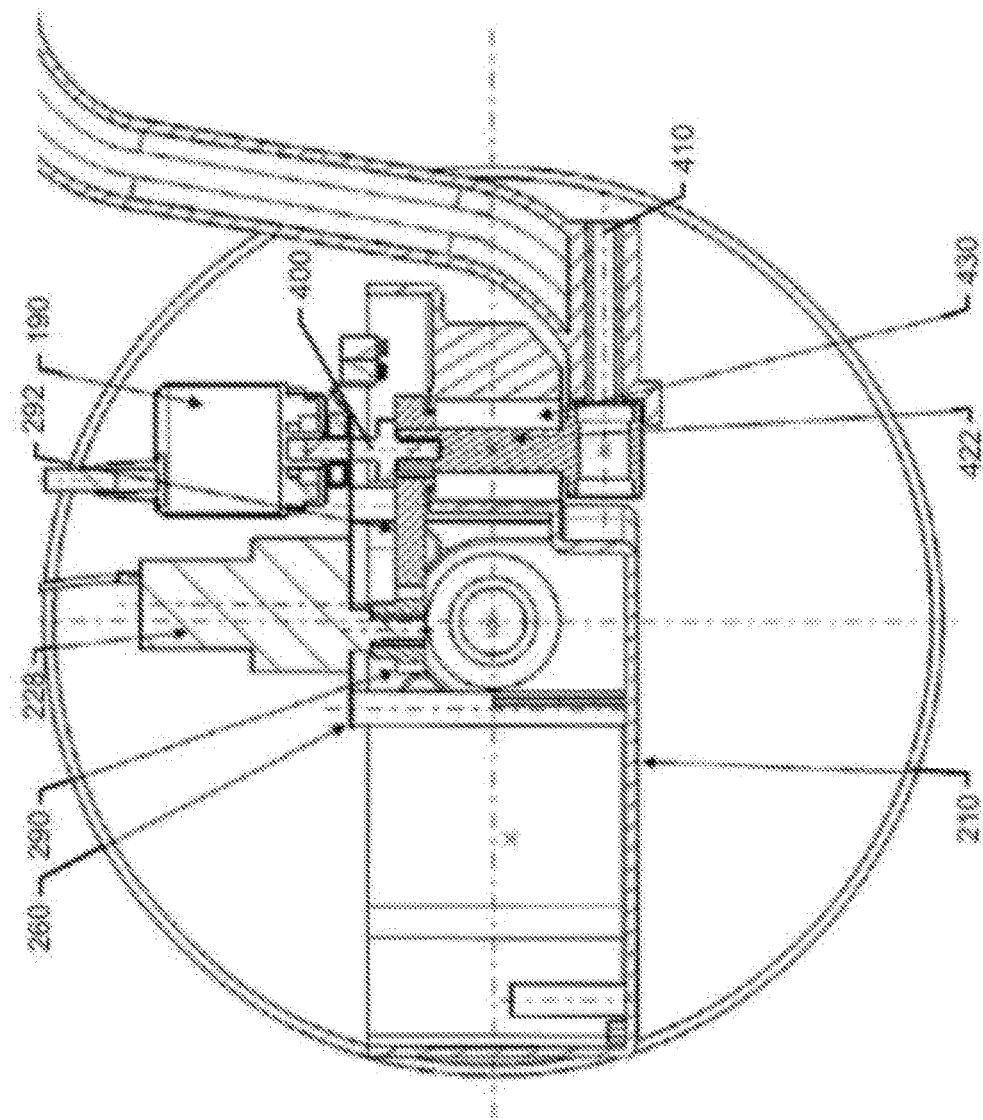
FIGS. 9A and 9B illustrate cross section views of a portion of the second chassis platform of example embodiments, to illustrate how a turning motor may be implemented according to an example embodiment.

Additionally or alternatively, friction of a gear box on a turning motor 228 (see FIG. 9A) may be utilized to maintain the turning angle. In some example embodiments, the turning motor 228 may be a step motor. Coils of the step motor may be energized to maintain a position of the step motor and therefore maintain the turning angle. In an example embodiment, the electric brake 262 may include a plunge or rod and the brake disc 263 may include one or more apertures. The solenoid may be actuated to cause the plunge or rod to penetrate an aperture of the disc brake locking the electric brake 262.

Figure 5E:
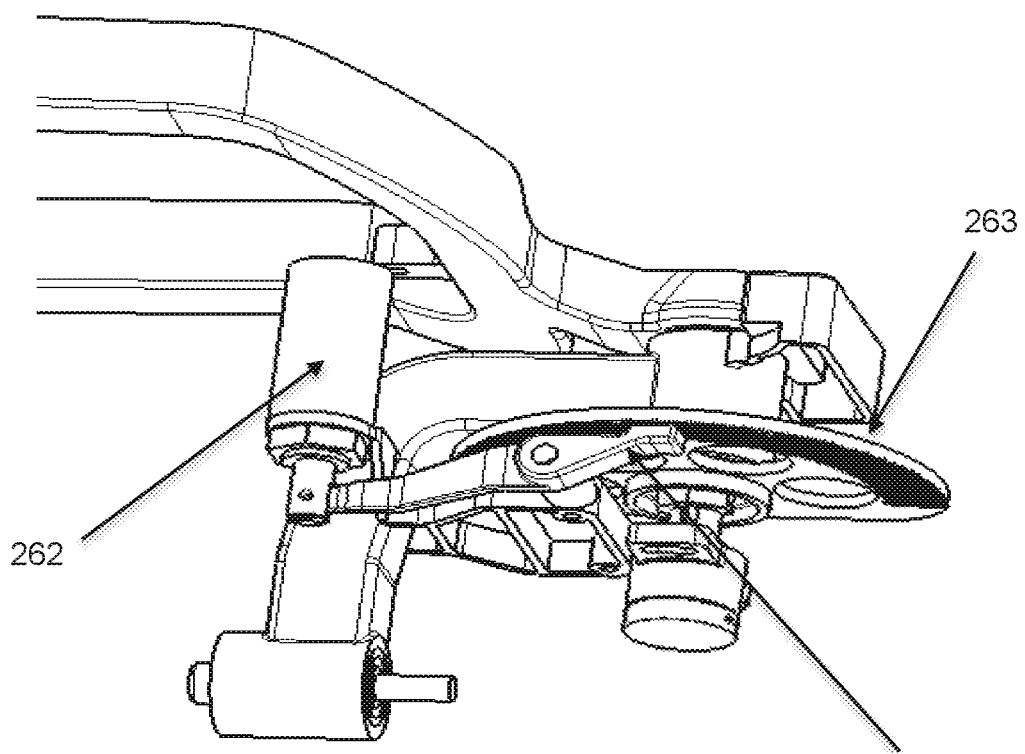
FIG. 5E illustrates an example of an electric brake according to an example embodiment.

FIG. 5E illustrates an example of an electric brake 262 according to an example embodiment. The electric brake 262 may include a solenoid configured to pivot a locking lever 268. The locking lever 268 may pivoted to engage the brake disc 263. Friction between the locking lever 268 and the brake disc 263 may maintain the turning angle. In an example embodiment, the locking lever 268 and/or the brake disc may include V grooves on the engagement surface to increase friction.

Figure 5F:
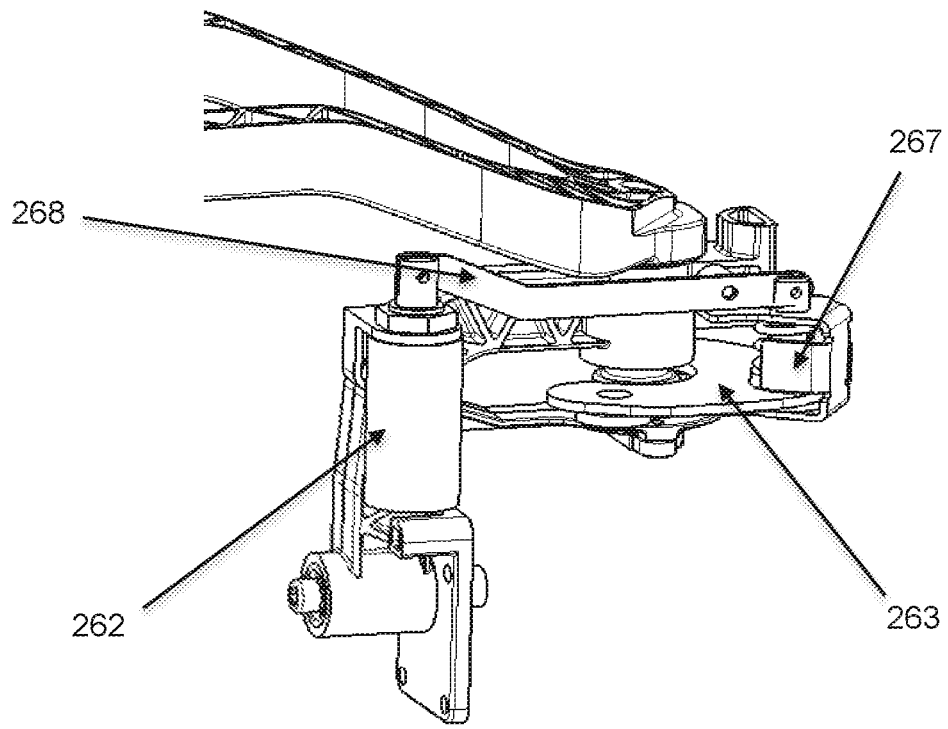
FIG. 5F illustrates an example of an electric brake according to an example embodiment.
Figure 5G:
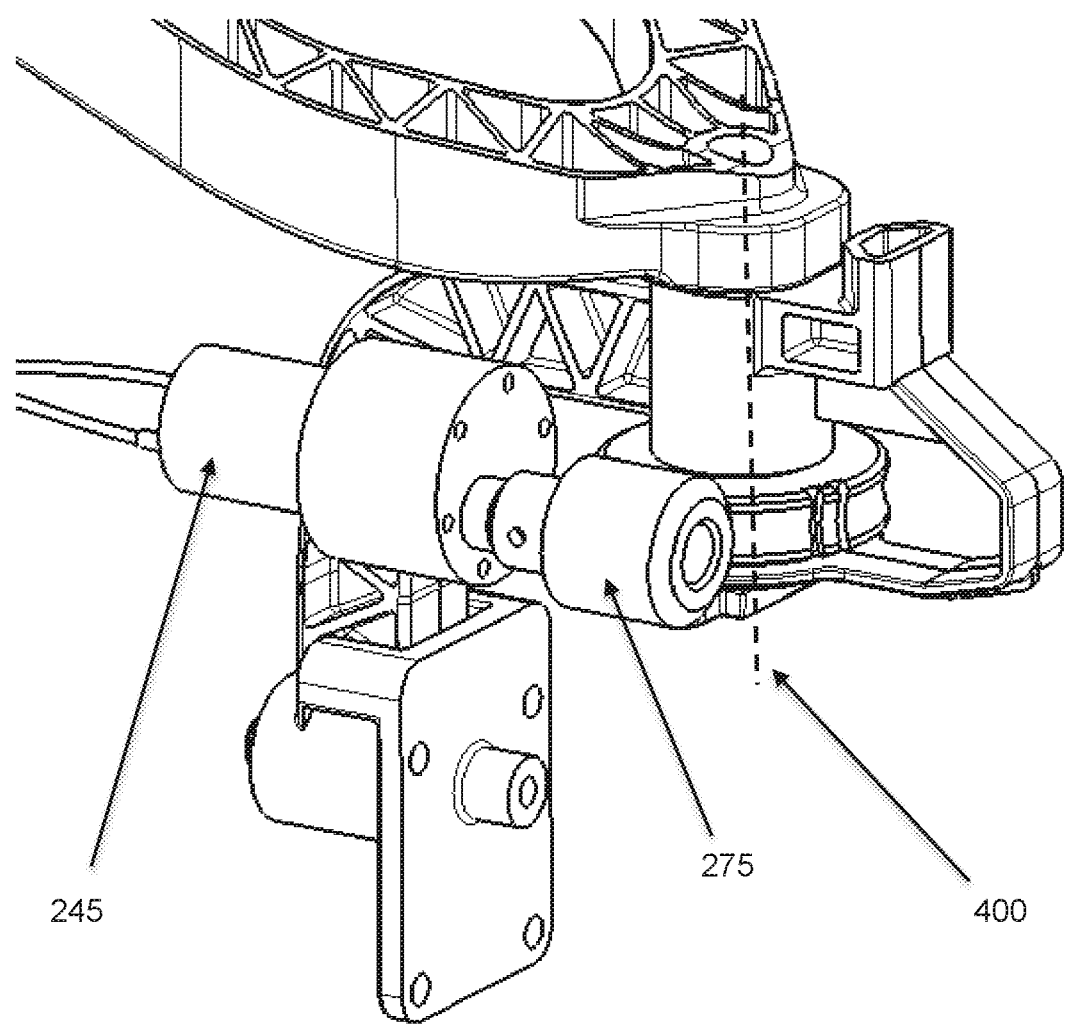
FIG. 5G illustrates an example of a turning motor gear drive according to an example embodiment.

FIG. 5F illustrates an example electric brake 262 according to an example embodiment. The electric brake 262 may include a solenoid configured to pivot a locking lever 268 similar to the electric brake discussed above in reference to FIG. 5E. The locking lever may be configure to push or withdraw a plunge or rod from one or more apertures in the brake disc 263, as discussed in reference to FIG. 5D. In an example embodiment, the plunge or rod may be returned to a non-actuated position by a return spring 267.

In some example embodiments of the robotic vehicle the electric brake is deenergized when applied and energized when released. In an example embodiment of the robotic vehicle, the electric brake includes a brake disc and an electromagnet configured to engage the brake disc when applied. In some example embodiments of the robotic vehicle, the brake disc and electromagnet comprise an electropermanent magnet. In an example embodiment of the robotic vehicle, the brake disc is a soft magnet. In some example embodiments of the robotic vehicle, in response to the electromagnet being energized a magnetic field is reversed. In an example embodiment of the robotic vehicle, the brake disk is physically connected to a guide rod allowing the brake disc to travel in response to the application of the electric brake, toward the electric brake, and in response to the release of the electric break, away from the electric brake. In some example embodiments of the robotic vehicle, the guide rod penetrates the break disc but does not penetrate a plane in which a surface facing the electromagnet lies. In an example embodiment of the robotic vehicle, the electromagnet is configured to rotate about the turning axis responsive to the second chassis platform turning about the turning axis and the electric brake is stationary relative to the turning axis and the electromagnet aligns with different points of the brake disc at different points of rotations about the turning axis.

In some example embodiments of the robotic vehicle, the brake disc extends around the turning axis to at least a maximum turning angle of the second chassis platform. In an example embodiment of the robotic vehicle, the brake disc extends at least 180 degrees around the turning axis. In some example embodiments of the robotic vehicle, the brake disc is forced to a first position in response to the electric brake being applied and moves to a second position in response to the electric brake being released.

The inventors have after insightful reasoning realized that providing a robotic vehicle that can selectively lock/unlock the brake(s) based on the initial traveling direction, and not only based on the driving angle, provides a more robust and efficient robotic vehicle. In prior art systems, only the angle has been used as an indicative to lock/unlock the brake(s), which leads to an incorrect estimation of the actual situation of the robotic vehicle 10.

In real life, the robotic vehicle can change its traveling direction without changing the driving angle. This may for example happen when the robotic vehicle 10 is travel down a wet or damped hill or slope, where the robotic vehicle starts to slide. The angle may also remain unchanged although the direction changes if the robotic vehicle 10 is travelling in challenging and uneven terrain, such as when bumping into objects, such as stones, driving over objects, such as stones or roots, or when the wheels experience different traction, or even one or more wheels are not in contact with the ground. The provision of selectively locking/unlocking the breaks based on the traveling direction and not solely on the driving angle is thus very inventive and important.

According to one embodiment of the present disclosure the robotic vehicle 10 may comprise a first chassis platform 200 having a first wheel assembly 202, and a second chassis platform 210 having a second wheel assembly 212. The first 200 and second 210 chassis platforms may be situated so as to be spaced apart from each other. The robotic vehicle 10 may further comprise a linkage 220, which is operably coupled to the first chassis platform 200 and the second chassis platform 210. The linkage 220 may be coupled so that the linkage 220 is fixed relative to the first chassis platform 200 and so that the second chassis platform 210 is rotatable relative to the first chassis platform 200. The second chassis platform 210 may also have a turning axis 400. The robotic vehicle 10 has an electric brake 262 disposed proximate to a turning shaft 422 of the linkage 220. The electric brake 262 may be selectively applied by processing circuitry 110 to resist turning of the second chassis platform 210 about the turning axis 400 and being selectively released to allow the second chassis platform 210 to turn about the turning axis 400. The second chassis platform 210 may be configured to be rotatable about the turning axle 400 being substantially parallel with the turning shaft 422.

By selective locking of the turning of the second chassis platform 210 relative the first chassis platform 200 self-steering of the robotic vehicle 10 may be prevented due to the increased stability achieved.

The robotic vehicle 10 is therefore configured to operate in a first and second mode. In the first mode, the electric brake 262 is configured to unlock the linkage 220, thus allowing for rotation of the second chassis platform 210 about the turning axis 400. In the second mode, the electric brake 262 is configured to lock the linkage 220, thus preventing rotation of the second chassis platform about the turning axis 400.

The processing circuitry 110 may be configured to obtain information of an initial turning indicator. The turning indicator is indicative of a change from an initial travelling direction of the robotic vehicle 10. The processing circuitry 110 may be further configured to switch operating mode for the robotic vehicle 10 upon obtaining information of said initial turning indicator.

The initial turning indicator may be indicative of an intended turn i.e. a turning instruction or an unintended turn, i.e. an initiation of a turn through self-steering. Hence, the turning indicator is not solely indicating a change in turning angle but the indication of a change in direction. A direction is here seen, of as a straight line, but as a course or path along which the robotic vehicle 10 moves and is an indication of the point toward or from which the robotic vehicle 10 is moving. A direction, or travel line, may have either a straight or a curved form. An angle, being a fixed singular value, should thus not be confused as a direction.

The processing circuitry 110 may be configured to obtain information of an initial turning indicator from at least one deduced reckoning (also known as dead reckoning) navigation sensor. The deduced reckoning sensor may be the same as the sensor 190 possibly in combination with a gyroscope as soon will be described more in detail or another separate sensor.

Deduced reckoning is commonly based on an odometer and a direction finder, such as a compass. Deduced reckoning works so that the last known position and direction is taken to be the current and assumed direction and by for example measuring the number of wheel turns (or rather turn speed of the wheel axel and the time) the current position is determined. It should be noted that the technique of deduced reckoning is also taken to include other forms of relative navigation, such as visual/optical navigation systems, SLAM (Simultaneous Location And Mapping) and fingerprint fusion to name a few.

The deduced reckoning may also include an accelerometer or inertia sensor, such as a gyroscope, for detecting and determining any sideways movement or other movement not possible or difficult to detect using only the compass and/or the odometer(s). For example, a collision that causes the robotic vehicle to "jump" off course, may not be detectable by the odometer or the compass, but the gyroscope would detect such a sideways movement as a change in inertia.

Hence, using deduced reckoning the processing circuitry 110 has information indicative of an initial change of travel direction.

The initial turning indicator may comprise information retrieved using deduced reckoning and/or using information of a gyroscope. In a preferred embodiment, the initial turning indicator comprise information retrieved using both deduced reckoning and using information of the gyroscope. In this way, the selectively locking/unlocking of the electric brake 262 is done based on the traveling direction and not only the incomplete information relating to the turning angle.

By controlling the brake based on the received initial turning indicator the robotic vehicle may be operated so as to upon any deviation from an initial travelling direction, desired or undesired, selectively lock or unlock the rotation of the second chassis platform. Hence, the rotation of said second chassis platform 210 is controlled in order to avoid self-steering.

In some cases, turning of the second chassis platform 210 could be accomplished by individually controlling speed and/or direction of drive power provided to at least some of the wheels of the first and second wheel assemblies 202 and 212; in some embodiments, the turning angle can be adjusted directly via a separate component (e.g., the turning motor 228).

Figure 6:
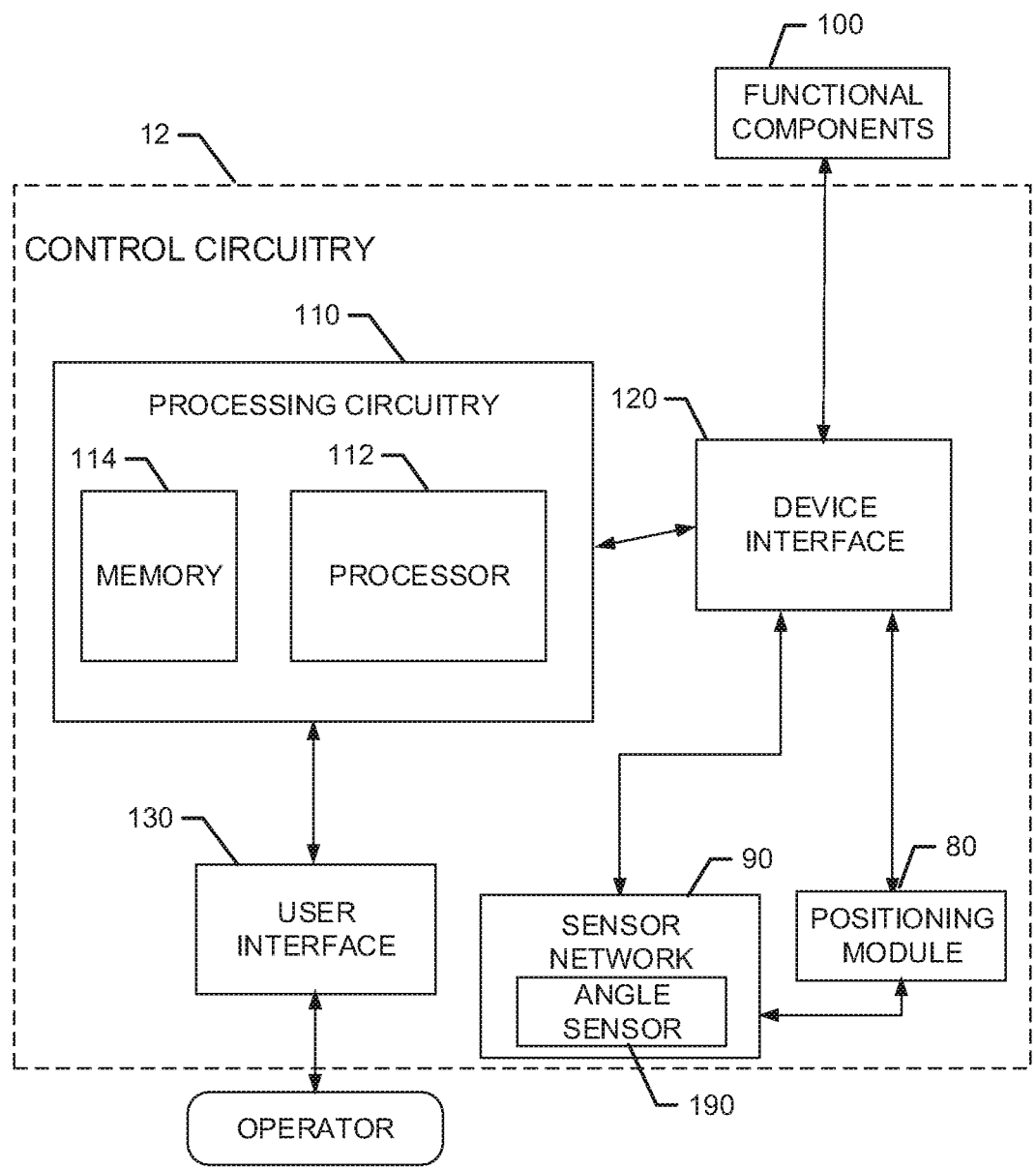
FIG. 6 illustrates a block diagram of various components of processing circuitry of the robotic mower to illustrate some of the components that enable the functional performance of the robotic mower and to facilitate description of an example embodiment.

FIG. 6 illustrates a block diagram of various components of a control circuitry 12 to illustrate some of the components that enable or enhance the functional performance of the robotic mower 10 and to facilitate description of an example embodiment. In some example embodiments, the control circuitry 12 may include or otherwise be in communication with a positioning module 80 and/or a sensor network 90 disposed at the robotic mower 10. As such, for example, the functions attributable to the positioning module 80 and/or the sensor network 90 may be carried out by, under the control of, or in cooperation with the control circuitry 12 in some cases.

The robotic mower 10 may be controlled, at least in part, via control circuitry 12 located onboard. The control circuitry 12 may include, among other things, a positioning module and a sensor module, which will be described in greater detail below. Accordingly, the robotic mower 10 may utilize the control circuitry 12 to define a path for coverage of the parcel 20 in terms of performing a task over specified portions or the entire parcel 20. In this regard, the positioning module may be used to guide the robotic mower 10 over the parcel 20 and to ensure that full coverage (of at least predetermined portions of the parcel 20) is obtained, while the sensor module may detect objects and/or gather data regarding the surroundings of the robotic mower 10 while the parcel 20 is traversed.

If a sensor module is employed, the sensor module may include a sensors related to positional determination (e.g., a boundary wired detector, a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors may be used, at least in part, for determining the location of the robotic mower 10 relative to boundaries or other points of interest (e.g., a starting point or other key features) of the parcel 20, or determining a position history or track of the robotic mower 10 over time. The sensors may also detect collision, tipping over, or various fault conditions. In some cases, the sensors may also or alternatively collect data regarding various measurable parameters (e.g., moisture, temperature, soil conditions, etc.) associated with particular locations on the parcel 20. Further, in some cases, the sensors may be used to detect slope and/or traction impacting conditions along with the amount of or angle of turn being attempted by the robotic vehicle.

The control circuitry 12 may include processing circuitry 110 that may be configured to perform data processing or control function execution and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. However, in some embodiments, the processing circuitry 110 may be embodied as a portion of an on-board computer. In some embodiments, the processing circuitry 110 may communicate with electronic components and/or sensors of the robotic mower 10 via a single data bus. As such, the data bus may connect to a plurality or all of the switching components, sensory components and/or other electrically controlled components of the robotic mower 10.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the positioning module 80, the sensor network 90, and/or other functional components 100 of or associated with the robotic mower 10. As such, in some embodiments, the processor 112 (or the processing circuitry 110) may be said to cause each of the operations described in connection with the positioning module 80, the sensor network 90, and/or other functional components 100 by directing the positioning module 80, the sensor network 90, and/or other functional components 100, respectively, to undertake the corresponding functionalities responsive to execution of instructions or algorithms configuring the processor 112 (or processing circuitry 110) accordingly. These instructions or algorithms may configure the processing circuitry 110, and thereby also the robotic mower 10, into a tool for performing corresponding functions in the physical world in accordance with the instructions provided.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the positioning module 80, the sensor network 90, and/or other functional components 100 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative, the memory 114 may include one or more databases that may store a variety of data sets responsive to input from various sensors or components of the robotic mower 10. Among the contents of the memory 114, applications may be stored for execution by the processor 112 in order to carry out the functionality associated with each respective application.

The user interface 130 (if implemented) may be in communication with the processing circuitry 110 to receive an indication of a user input at the user interface 130 and/or to provide an audible, visual, mechanical or other output to the user. As such, the user interface 130 may include, for example, a display, one or more buttons or keys (e.g., function buttons), and/or other input/output mechanisms (e.g., microphone, speakers, cursor, joystick, lights and/or the like).

The device interface 120 may include one or more interface mechanisms for enabling communication with other devices either locally or remotely. In some cases, the device interface 120 may be any means such as a device or circuitry embodied in either hardware, or a combination of hardware and software that is configured to receive and/or transmit data from/to sensors or other components in communication with the processing circuitry 110. In some example embodiments, the device interface 120 may provide interfaces for communication of data from the control circuitry 12, the positioning module 80, the sensor network 90, and/or other functional components 100 via wired or wireless communication interfaces in a real-time manner, as a data package downloaded after data gathering or in one or more burst transmission of any kind.

The positioning module 80 may be configured to utilize one or more sensors to determine a location of the robotic mower 10 and direct continued motion of the robotic mower 10 to achieve appropriate coverage of the parcel 20. As such, the robotic mower 10 (or more specifically, the control circuitry 12) may use the location information to determine a mower track and provide full coverage of the parcel 20 to ensure the entire parcel is mowed. The positioning module 80 may therefore be configured to direct movement of the robotic mower 10, including the speed and direction of the robotic mower 10. Various sensors of sensor network 90 the robotic mower 10 may be included as a portion of, or otherwise communicate with, the positioning module 80 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver and/or accelerometer) may be included to monitor, display and/or record data regarding vehicle position and/or orientation as part of the positioning module 80.

The processing circuitry 110 may be configured to control the turning of the robotic vehicle 10 by controlling of a turning means. Examples on controlling said turning means may be controlling of the individual wheels of the second wheel assembly or a turning motor. The processing circuitry 110 may be configured to generate a turning instruction received by the turning means. Upon receiving the turning instruction the turning means is activated, causing the second chassis platform to turn. The processing circuitry 110 may in some cases be configured to receive a turning instruction directly from a user interface 130 for example via a receiving unit connected to the processing circuitry 110 whereby the processing circuitry 112 may generate a signal prompting the turning means to initiate the turning of the second chassis platform 210.

In some cases, the turning instructions may be generated by the processing circuitry 110 itself. Such cases may for example include when the robotic vehicle is moving along a preconfigured route and arriving at a preconfigured turn of said route. Such cases may also include to upon detection of an obstacle in the present travelling direction by a proximity sensor on the robotic vehicle 10 connected to the control circuitry 12 or processing circuitry 110, directly or via the sensor network 90 prompting said turning instruction.

According to one embodiment the initial turning indicator may be obtained from the turning instruction to be executed by the robotic vehicle 10. Hence, upon generation of a turning instruction the processing circuitry 110 may further generate a signal prompting the electric brake 262 to engage or disengage, i.e. changing the operational mode of the robotic vehicle 10

The processing circuitry 110 may be configured to upon obtaining the turning indicator from a turning instruction, switch operating mode for the robotic vehicle 10 from the second mode to the first mode. Thus, the first chassis platform 200 and second chassis platform 210 may be rotationally locked when the robotic vehicle 10 is moving in an initial travelling direction. Upon obtaining the initial turning indicator from the turning instruction to be executed the control circuitry 12 switches mode from the second to the first, whereby the robotic vehicle is enabled to turn according to the turning instruction. Hence, self-steering may be avoided when the robotic vehicle 10 is moving in a straight direction without affecting turning capability during intended turns. Furthermore, said embodiment allows for an efficient mean to avoid self-steering in challenging terrain with few components and a low complexity.

Above mentioned embodiment may be particularly advantageous when the electronic brake 262 is deenergized when applied and energized when released. According to the present embodiment the electric brake 262 will be applied, or locked, whenever the robotic vehicle 10 is travelling in an intended direction. Thus, the brake will only be energized when an initial turning indicator is obtained, leading to a lower energy consumption.

According to another embodiment, the sensor network 90 may include a sensor 190 that may be configured to detect a turning indicator value. A value detected by the sensor 190 may be indicative of initiation of non sanctioned turning motion for the second chassis platform 210 due to introduced self-steering or instability.

In such an embodiment the processing circuitry 110 is connected to said sensor network 90 and sensor 190. Said processing circuitry 110 may upon detection of a turning indicator value indicative of initiation of a deviation from the initial travelling direction generate a signal prompting the electronic brake 262 to engage or disengage, i.e. prompting the robotic vehicle 10 to switch operating mode.

Advantageously, the processing circuitry 110 is further configured to detect whether a turning instruction has been generated. Hence, the turning indicator value may be compared to the generated turning instruction. If the turning indicator value matches the turning instruction the turn may be recognized as an intended turn, thus not prompting the processing circuitry to change operating mode for the robotic vehicle 10. If the turning indicator value does not match the generated turning instruction or if no turning instruction has been generated the turn may be recognized as an unintended turn thus prompting the processing circuitry to change operating mode for the robotic vehicle 10.

The robotic vehicle 10 may further comprise a gyroscope, configured to keep said robotic vehicle 10 in the initial travelling direction. Said gyroscope may be configured to be connected to and controlled by the processing circuitry 110. By implementing a gyroscope the robotic vehicle 10 will be able to adapt the steering of the wheels so as to keep the robotic vehicle 10 moving in a straight direction. Furthermore, the gyroscope enables the second chassis platform 210 to be unlocked even when the robotic vehicle 10 is moving in the initial travelling direction which enables the robotic vehicle 10 to closely follow the terrain which may be particularly advantageous in gardening applications, such as mowing.

A gyroscope may detect an indication of a change of the travel direction. In some embodiments the initial turning indicator is at least in part obtained by the gyroscope. By combining information from deduced reconing and the information from the gyroscope it is possible to establish the path, i.e. direction, which the robotic vehicle is moving.

However, implementing a gyroscope will not prevent self-steering completely; therefore it may be desirable to selectively lock the turning of the second chassis platform 210 in order to avoid such self-steering or otherwise unstable driving behavior.

Thus, the robotic vehicle 10 may comprise a gyroscope configured to adjust the steering of the second wheel assembly 212 to keep the robotic vehicle 10 in the initial travelling direction. Furthermore, the processing circuitry 110 may be configured to upon detection of an initial turning indicator switch operating mode for the robotic vehicle 10. The occurring switch is made from the first mode to the second mode. The turning indicator may be indicative of unintentional turning of the second chassis detected by the sensor 190. By only activating the electronic brake 262 during unintentional turning the brake will be subject to less usage, thus being less susceptible to wear. Furthermore, unintended turning due to self-steering may be reduced.

Advantageously, the present embodiment may comprise an electronic brake 262 configured to be energized when applied and deenergized when released. An electronic brake 262 with such features allows for lower energy consumption, since said brake 262 will only consume energy upon detection of the initial turning indicator and remain deenergized during all other conditions.

The processing circuit 110 may according to one embodiment be configured to switch operating mode for the robotic vehicle 10 from the first mode to the second mode when the turning indicator value is above a turning indicator threshold value. Thus, the gyroscope is allowed to compensate for minor turning errors due to self-steering without activating the brake resulting in less wear on the brake. Also, the allowed minor articulation enables the robotic vehicle to more closely follow the terrain, which may be particularly advantageous in a gardening application such as mowing.

The processing circuit 110 may further be configured to return the robotic vehicle 10 back to operation in the first mode from the second mode when the turning indicator value is below the turning indicator threshold value. This allows for the robotic vehicle 10 to rapidly stabilize and return to the initial travelling direction by assistance from the gyroscope making the robotic vehicle 10 more directionally robust and less susceptible to instability.

The initial turning indicator detected by the sensor 190 may be configured to detect the alignment of the first 200 and second 210 chassis platform in relation to each other. Consequently, the turning indicator value may be a change in an alignment value collected from said sensor 190.

Detected alignment values may for example include angular values or distance values. According to one example the sensor 190 may be a distance sensor configured to detect changes in the longitudinal or lateral distance between two points, wherein a first point may be situated on first chassis platform 200 and a second point may be situated on the second chassis platform.

According to another example the sensor 190 may be an angle sensor configured to determine the turning angle of the robotic mower 10 (or of a set of wheels or individual chassis portion of the robotic mower 10). The angle sensor 190 may be provided in a number of different forms, some of which will be described in greater detail below. However, in some cases, the angle sensor 190 may be any means such as a device or circuitry embodied in either hardware, or a combination of hardware and software that is configured to determine a turning angle of one chassis portion or set of wheels relative to another chassis portion or set of wheels. The initial turning indicator may be an angular value detected by said angle sensor 190 configured to communicate with the processor circuitry 110. Hence, unintended self-steering can quickly be detected and accounted for.

According to one exemplary embodiment, the alignment value detected by the sensor 190 is a change in turning angle ? about the turning axis 400 of the second chassis platform 210 in relation to the first chassis platform 200.

In some cases, the processing circuitry 110 may be configured to switch operating mode for the robotic vehicle 10 from the first mode to the second when the turning angle exceeds a threshold angle.

In order to increase the ability for the robotic vehicle to handle tougher terrain with for example inclinations, small pits as well as for increasing turning ability the robotic vehicle 10 may be an articulated all wheel driven vehicle with articulated rear wheel steering. According to such an embodiment the first chassis platform 200 may be a front portion of the robotic vehicle 10 and the second chassis platform 210 may a back portion of said robotic vehicle 10.

In some embodiments, the turning motor 228 may be powered by a power unit 230 and controlled by the control circuitry 12 to facilitate turning of the robotic mower 10 as described in greater detail below. However, turning of the robotic mower 10 can be handled entirely by control of speed and direction of turning of the wheels. Thus, the turning motor 228 could be completely eliminated in some embodiments.

In some example embodiments, each wheel of the first wheel assembly 202 may be powered by a single first drive motor (which may be an electric motor in some examples). Each wheel of the second wheel assembly 212 may also be powered by a single second drive motor (which may again be an electric motor). In such examples, power may be deliverable (selectively or continuously) from the respective drive motors to each of the wheels so that the robotic mower 10 has drive power deliverable to all four wheels. Thus, the robotic mower 10 may be considered to be an all-wheel drive (AWD) robotic vehicle.

In some other example embodiments each one of the wheels may have its own separate drive motor. Thus, each wheel of the first wheel assembly 202 may be powered by a corresponding drive motor of a first set of drive motors 204 (each of which may be an electric motor). Each wheel of the second wheel assembly 212 may also be powered by a corresponding drive motor of a second set of drive motors 214 (each of which may again be an electric motor). In such examples, power may be deliverable (selectively or continuously) from the respective drive motors to each of the wheels so that the robotic mower 10 has drive power deliverable to all four wheels to again provide an AWD robotic vehicle.

Figure 7A:
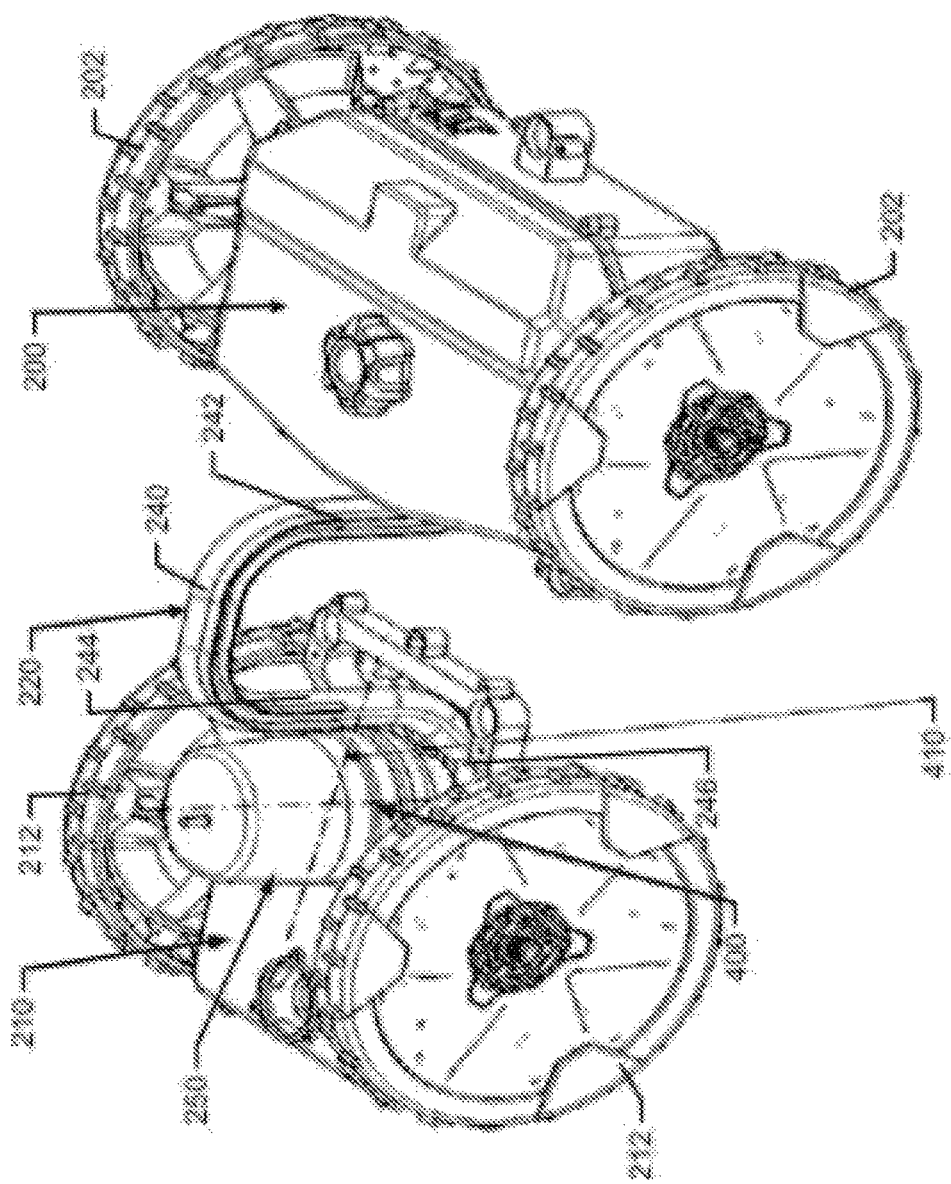
FIG. 7A illustrates the combination linkage connecting the first chassis platform to the second chassis platform in accordance with an example embodiment.
Figure 7B:
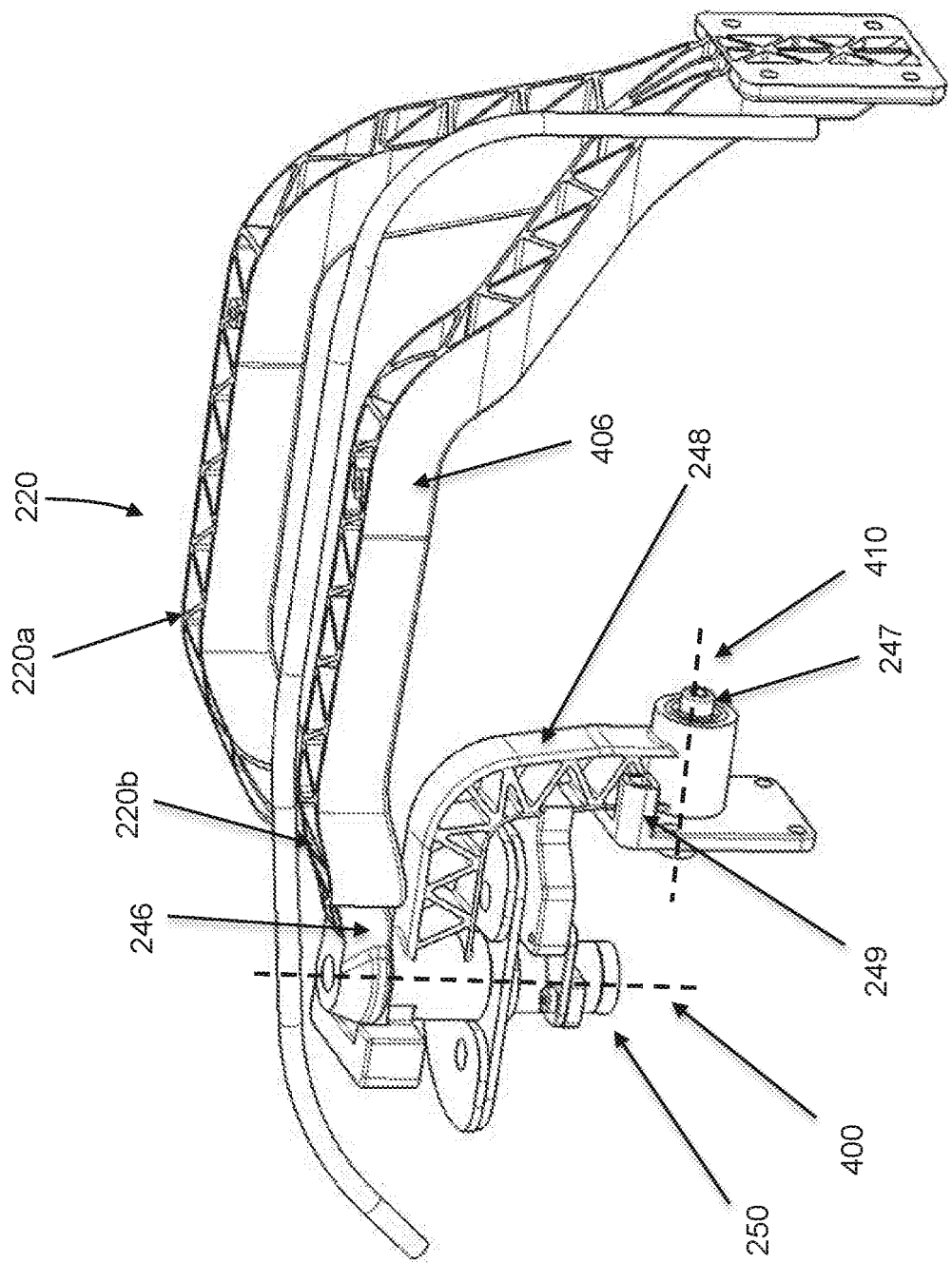
FIG. 7B illustrates an example of a combination linkage including two combination linkage arms according to an example embodiment.

In some example embodiments, the linkage 220 may also be configured to enable pivoting about a pivot axis that is substantially perpendicular to the turning axis. FIG. 7 illustrates how the turning axis and pivot axis are oriented relative to each other in an example embodiment. In this regard, FIG. 7A illustrates the linkage 220 connecting the first chassis platform 200 to the second chassis platform 210. The linkage 220 includes a cross-arm 240, a first lift arm 242, and a second lift arm 244, that correspond to the respective same components described above. As can be seen in FIG. 7A, the second lift arm 244 couples to a coupling arm 246, which is operably coupled to a turn assembly 250. The coupling arm 246 may be operably coupled to the bottom of the turn assembly 250. The turn assembly 250 allows the second chassis platform 210 to rotate about the turning axis 400, which is substantially perpendicular to the longitudinal centerline of the robotic mower 10. However, the operably coupling of the coupling arm 246 and the turn assembly 250 further enables the second chassis platform 210 to pivot about a pivot axis 410 that is substantially perpendicular to the turning axis 400.

Figure 8A:
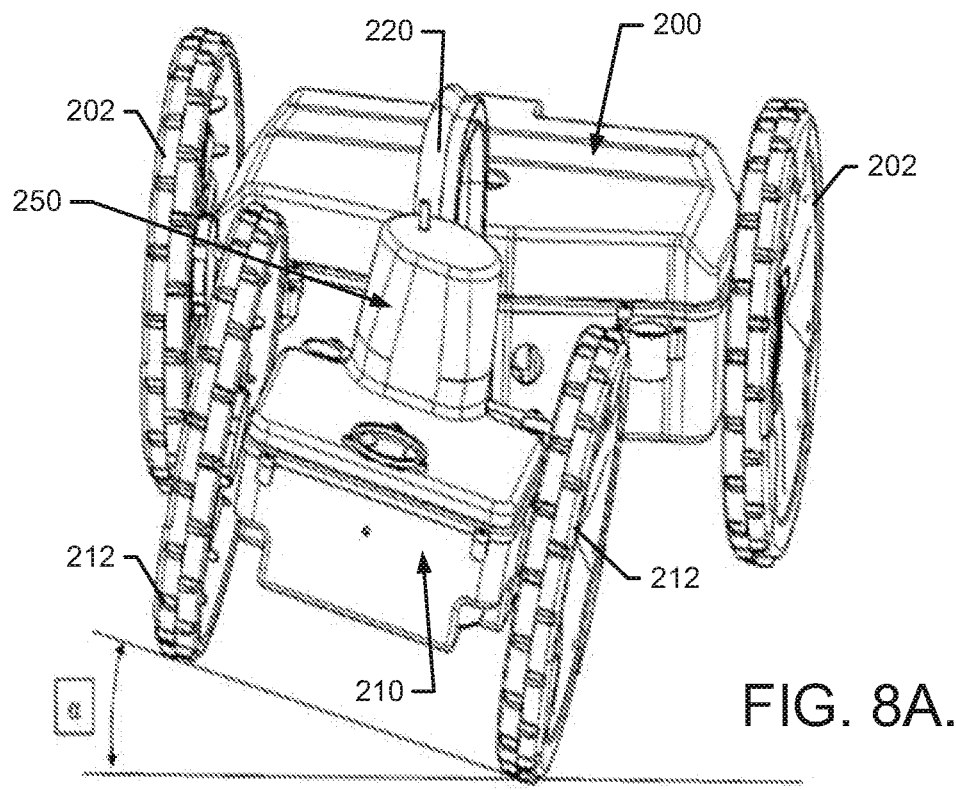
FIGS. 8A and 8B, shows examples of how pivoting about the pivot axis allows a common axis of a first wheel assembly and a common axis of a second wheel assembly to be in different planes in accordance with an example embodiment.
Figure 8B:
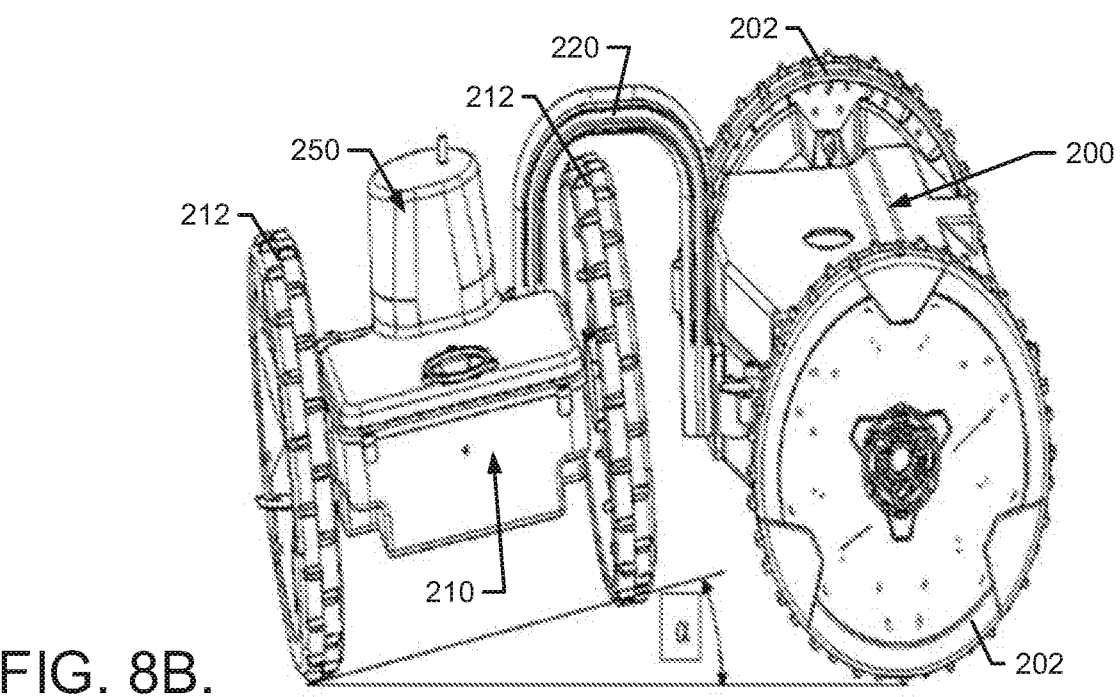

In an example embodiment, the second chassis platform 210 may be enabled to rotate as much as 360 degrees around the turning axis 400. However, the range of motion about the pivot axis 410 may be substantially less. In this regard, in some cases, the amount of pivoting about the pivot axis 410 may be limited to about +/−5 degrees or a maximum of +/−10 degrees side to side. FIG. 8, which includes FIGS. 8A and 8B, shows examples of how pivoting about the pivot axis 410 allows the common axis of the first wheel assembly 202 and the common axis of the second wheel assembly 212 to be in different planes due to the ability of the second chassis platform 210 to pivot about the pivot axis 410. This may provide for enhanced terrain following and contact of the first and second wheel assemblies 202 and 212 regardless of terrain. In this regard, a differential plane angle ? may be defined between the common axis of the first wheel assembly 202 and the common axis of the second wheel assembly 212.

Again referring back to FIG. 5, FIG. 5A illustrates a cross section view of the turn assembly 250 to facilitate a description of how the rotation about the turning axis 400 and pivot axis 410 may be accomplished in accordance with one example embodiment. As shown in FIG. 5A, the turn assembly 250 may include the angle sensor 190 (or turning sensor) mounted at the end of a turning shaft extension 420 that extends from a turning shaft 422 that connects to the coupling arm 246. The turning shaft 422 may be substantially perpendicular to the coupling arm 246 and may be substantially parallel to the second lift arm 244. The angle sensor 190 may be configured to monitor the orientation of the second chassis platform 210 relative to the first chassis platform 200 and/or the longitudinal centerline of the robotic mower 10 (or the linkage 220).

The turning shaft 422 is according to one embodiment mounted to the second chassis platform 210 via a pivot bearing 430. Said pivot bearing 430 may be configured to allow pivoting about a pivot axis 410 substantially perpendicular to the turning axis 400. The pivoting bearing 410 enables the robotic vehicle to more closely follow the terrain i.e. enhancing the terrain following capability of the robotic vehicle 10 which may be particularly advantageous in a gardening application such as mowing. An articulated robotic vehicle with a pivot bearing may however risk being unstable and can become stagnant when running over obstacles. By selectively locking the rotation of the second chassis platform 210 the stability of the robotic vehicle 10 can increase, achieving a more reliable robotic vehicle suitable for a wider range of terrain.

In an alternative embodiment the pivot bearing 430 may be a free bearing allowing for pivoting in all directions such as for example a ball bearing, thus the further the terrain following capability is enhanced further.

The turning sensor 190 may be provided proximate to a fixed bracket 260 inside which an electric brake 262 may be housed. The electric brake 262 may be applied to lock the turning shaft 422 and/or the turning shaft extension 420 at a particular turning angle based on information indicating the current turning angle as determined by the angle sensor 190. Thus, for example, when the electric brake 262 is unlocked, the second chassis platform 210 may be free to rotate about the turning axis 400 to execute turns or insert a turning angle to position the second chassis platform 210 at a desirable angle or orientation relative to the first chassis platform 200. When driving straight or otherwise attempting to maintain a particular turning angle, the electric brake 262 may be applied, e.g., under the control of the control circuitry 12, to prevent further rotation about the turning axis 400. In an example embodiment, the control circuitry 12 may compare the current turn angle to a target turn angle. The control circuitry 12 may applies the electric brake 262 in response to the current turn angle satisfying a turn angle divergence threshold, for example zero or one degree divergence from the target turn angle. Similarly, the control circuitry 12 releases the electric brake 262 in response to the current turn angle failing to satisfy the turn angle divergence threshold.

Figure 9B:
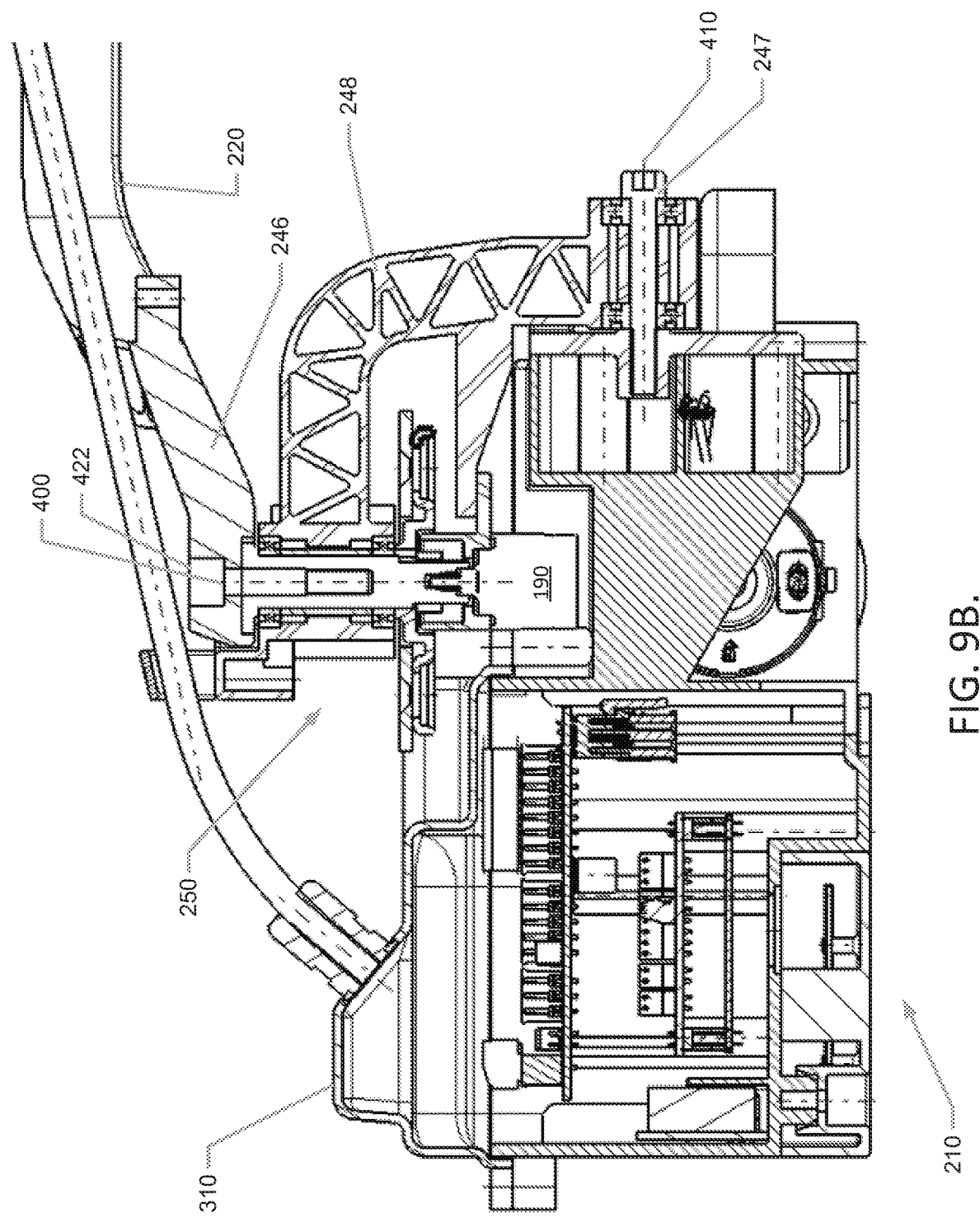

The turning shaft 422 may be enabled to pivot about the pivot axis 410 due to the turn assembly 250 allowing a certain amount of "play" relative to the pivot axis 410 to accommodate for terrain and slope changes. In this regard, a bearing assembly 430 (see FIG. 9) may be provided that allows the turning shaft 422 to move, at least to some degree, about the pivot axis 410. In particular, the turn assembly 250 (and more particularly the bearing assembly 430 thereof) may include a pivot bearing housing 270 to house pivot bearings 272 oriented to allow pivoting about the pivot axis 410 and a turn bearing housing 280 to house turn bearings 282 disposed along the turning shaft 422 to support rotational movement of the turning shaft 422. As such, the pivot bearing housing 270 may be assembled to screw bosses of the turn bearing housing 280 to enable the pivot bearing housing 270 to pivot (e.g., about +/−5 degrees). The pivot bearing housing 270 and the second chassis platform 210 may therefore both be enabled to rotate and pivot responsive to movement of the second chassis platform 210 over sloped or uneven ground while turning or driving straight ahead.

Although in some cases, turning of the second chassis platform 210 could be accomplished by individually controlling speed and/or direction of drive power provided to at least some of the wheels of the first and second wheel assemblies 202 and 212, in some embodiments, the turning angle can be adjusted directly via a separate component (e.g., the turning motor 228).

Figure 10:
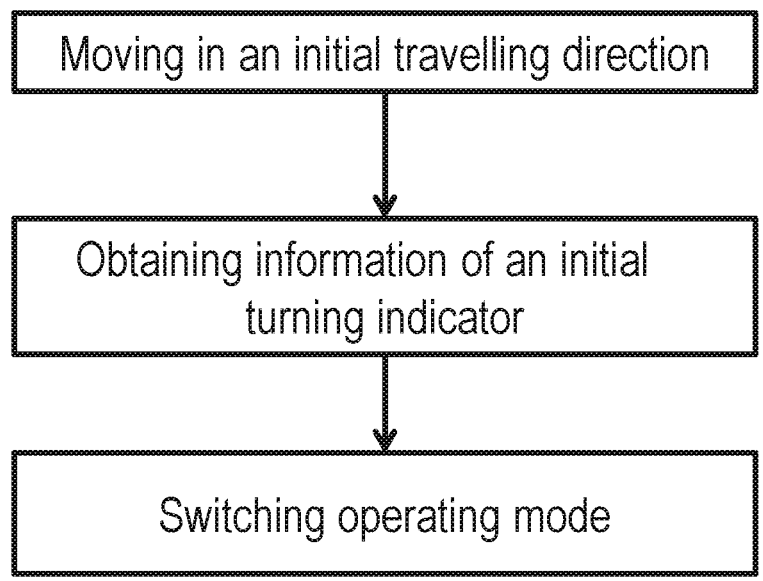
FIG. 10 illustrates a flow chart for a method for controlling a robotic vehicle according to an example embodiment.

FIG. 10 discloses an exemplary method for controlling a robotic vehicle 10 wherein the robotic vehicle 10 is travelling in an initial travelling direction. The method include to upon obtaining information of an initial turning indicator indicative of a change from an initial travelling direction of the robotic vehicle (10) switch operating mode for the robotic vehicle 10.

Figure 11:
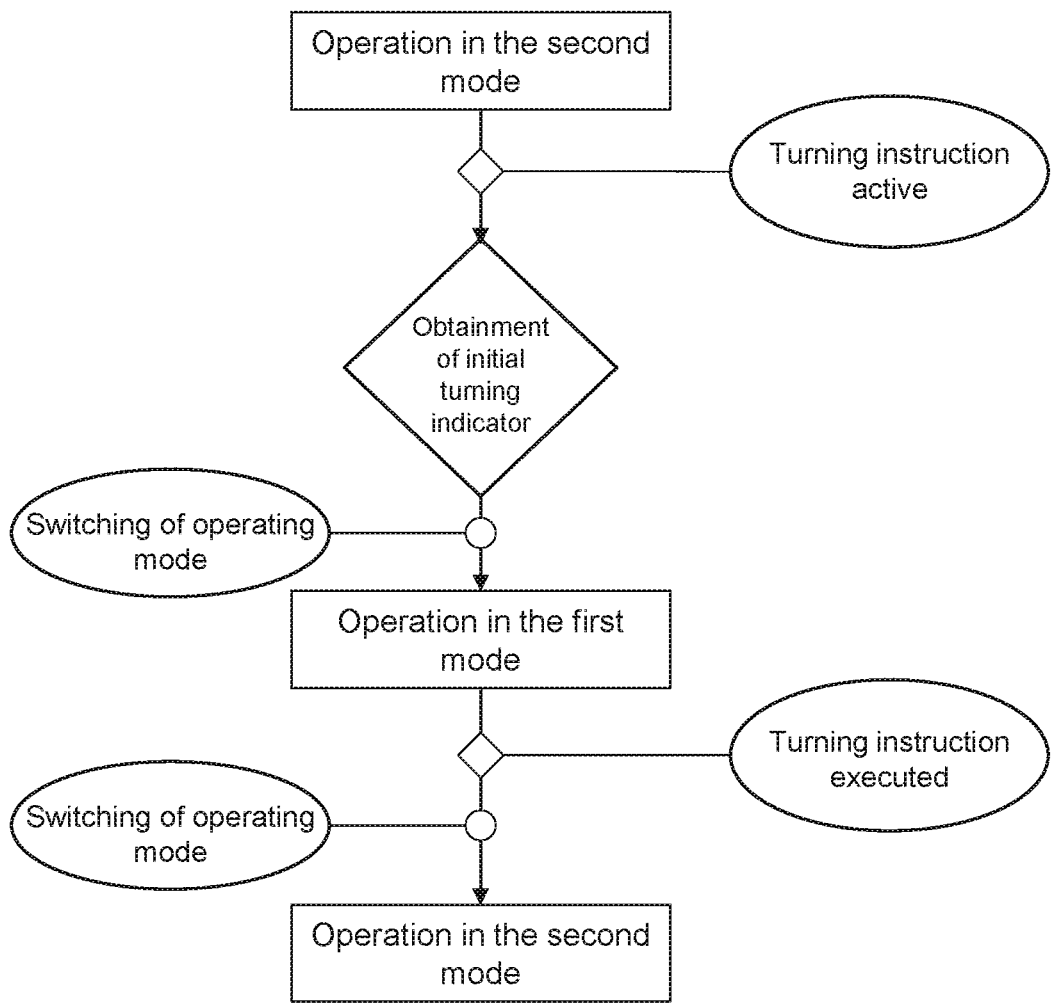
FIG. 11 illustrates a flow chart for a method for controlling a robotic vehicle according to a further example embodiment.

FIG. 11 discloses an exemplary method wherein the step of obtaining information of an initial turning indicator further comprises obtaining the initial turning indicator from a turning instruction to be executed by the robotic vehicle 10. Further, the step of switching operating mode for the robotic vehicle 10 comprises switching operating mode for the robotic vehicle 10 from the second mode to the first mode when the initial turning indicator is obtained. Preferably, an additional switching of operating mode is also performed, i.e. a switch from the first mode back to the second mode. Said switching of operating mode may be prompted by the turning instruction being executed i.e. when the desired turn prompted by the turning instruction has been performed. In some embodiments an executed turn may be identified through sensory means. In some examples the previously described sensor 190 may be used for identifying a performed turn by detecting that the first 200 and second 210 chassis platforms have a parallel alignment or that the turning angle between the first and second chassis platforms about the turning axis 400 is small, preferably less than 5 degrees. In some embodiments the identification of an executed turning instruction may be done via the turning instruction remaining active throughout the turning until said turn has been performed, whereby said turning instruction may be deactivated, thus indicating that the desired turn has been finalized.

The first mode may be seen as a turning mode and the second mode as a traveling mode where the robotic vehicle has a straight traveling direction. Hence, in the turning mode, i.e. when the robotic vehicle 10 is turning, the electric brake 262 is unlocked so as to allow for rotation of the second chassis platform 210. In the traveling mode, i.e. when the robotic vehicle 10 has a straight traveling direction, the electric brake 262 is configured to lock the linkage 220 thus preventing rotation of the second chassis platform. Preferably, the electric brake 262 is locked when the robotic vehicle 10 is running in a straight initial travelling direction and the brake 262 is unlocked once the robotic vehicle starts to turn (i.e. a change in traveling direction).

The processing circuitry 110 may be configured to switch operating mode for the robotic vehicle 10 from the second mode to the first mode upon obtaining the initial turning indicator. In other words, the processing circuitry 110 is configured to switch from the traveling mode (second mode) to the turning mode (first mode) upon obtaining information (an initial turning indicator) that the robotic vehicle 10 is moving in an a direction other than the initial travelling direction of the robotic vehicle 10. The processing circuitry 110 is thus configured to switch from a traveling mode to a turning mode once an initial turn has been detected.

In one embodiment, the processing circuitry 110 is configured to switch operating mode for the robotic vehicle 10 from the second mode to the first mode when the turning indicator value is above a turning indicator threshold value. Additionally, the processing circuitry 110 may be configured to return the robotic vehicle 10 back to operation in the second mode from the first mode when the turning indicator value is below the turning indicator threshold value.

Figure 12:
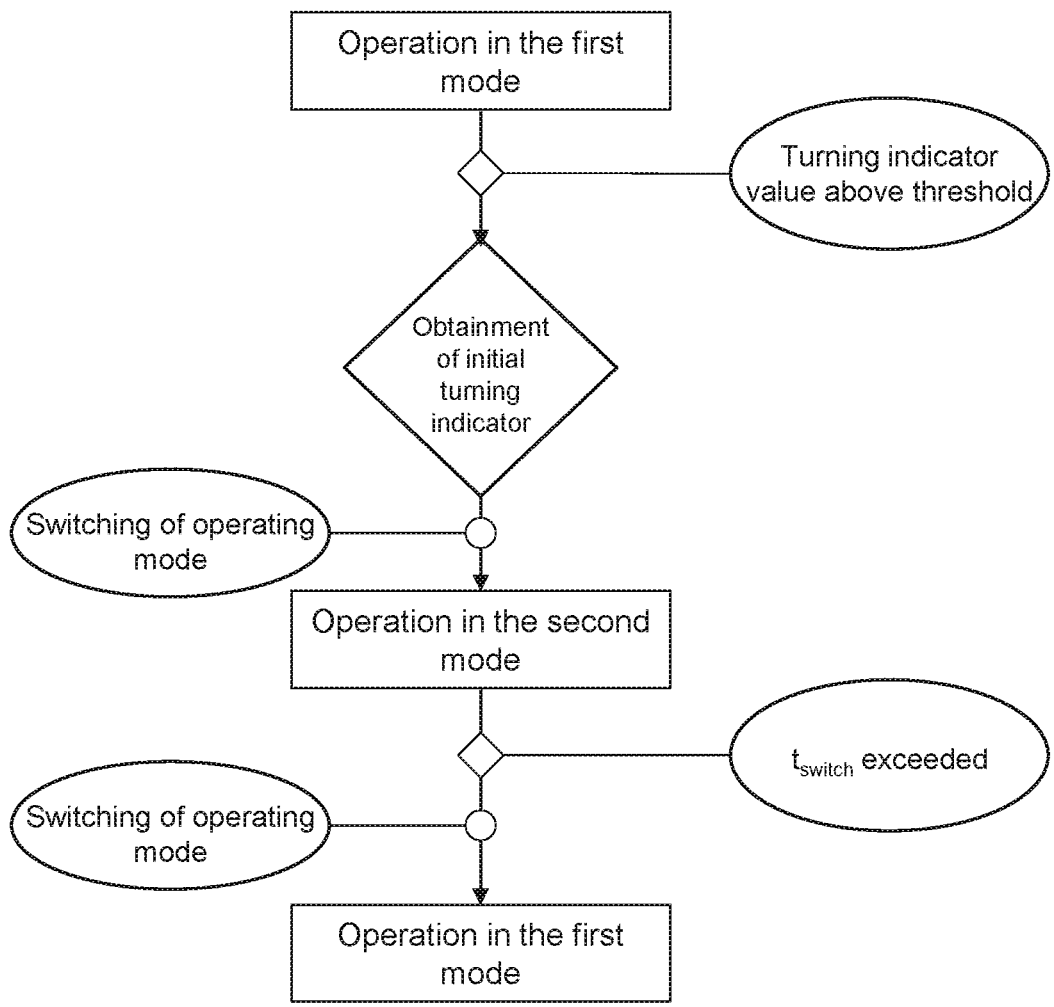
FIG. 12 illustrates a flow chart for a method for controlling a robotic vehicle according to another example embodiment.

FIG. 12 illustrates another exemplary method wherein the step of obtaining the initial turning indicator further comprises obtaining the initial turning indicator through detection of a turning indicator value. The detection may be performed via the previously described sensor 190. Further, the step of switching operating mode for the robotic vehicle (10) also comprises switching the operating mode for the robotic vehicle (10) from the first mode to the second mode when the turning indicator value is above a turning indicator threshold value. Advantageously, the robotic vehicle 10 is controlled so as to return to the first operating mode from the second operating mode after a period of time tswitch has exceeded. Hence, the robotic vehicle 10 can be controlled in a manner which increases the stability and terrain following capabilities of said robotic vehicle 10 by allowing the robotic vehicle 10 to stabilize upon detection of instability via detection of unintended turns.

The turning indicator threshold value may according to one example be a change in turning angle about the turning axis 400 of the second chassis platform 210 in relation to the first chassis platform 200. Said threshold value may be chosen so as to rapidly counteract unintentional turning but not be too small so as to cause unnecessary activation of the electric brake 262. Thus, the turning indicator threshold value may be between 1 and 10 degrees, but preferably around 5 degrees.

The time period tswitch may be chosen so as to allow for the robotic vehicle 10 to stabilize upon detected unintentional turning. It may be advantageous for the time period tswitch to be between 1 and 10 seconds, but it may be even more preferable if the time period tswitch is between 1 to 5 seconds.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, the presented exemplary use cases are in no way intended as limiting, but simply as means to further exemplify how present invention can be used in different applications. As used herein, the terms "comprise/comprises" or "include/includes" do not exclude the presence of other elements or steps. Furthermore, although individual features may be included in different claims (or embodiments), these may possibly advantageously be combined, and the inclusion of different claims (or embodiments) does not imply that a certain combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A robotic vehicle comprising:
a first chassis platform comprising a first wheel assembly;
a second chassis platform comprising a second wheel assembly, the first and second chassis platforms being spaced apart from each other;
a linkage operably coupled to the first chassis platform and the second chassis platform, such that the linkage is fixed relative to the first chassis platform, and such that the second chassis platform is rotatable relative to the first chassis platform, wherein the second chassis platform comprises a turning axis;
an electric brake disposed proximate to a turning shaft of the linkage, the electric brake being selectively applied by processing circuitry to resist turning of the second chassis platform about the turning axis and being selectively released to allow the second chassis platform to turn about the turning axis;
wherein the robotic vehicle is configured to operate in:
a first mode, wherein the electric brake is configured to unlock the linkage, thus allowing for rotation of the second chassis platform about the turning axis in order to change an actual turn angle of the robotic vehicle,
a second mode, wherein the electric brake is configured to lock the linkage, thus preventing rotation of the second chassis platform about the turning axis in order to minimize self-steering and instability of the robotic vehicle after the actual turn angle of the robotic vehicle matches a desired turn angle,
wherein the processing circuitry is configured to correct self-steering by selecting the first mode and minimize self-steering and instability of the robotic vehicle by selecting the second mode responsive to detecting that the actual turn angle of the robotic vehicle differs from the desired turn angle of the robotic vehicle.

2. The robotic vehicle according to claim 1, wherein the first mode is a turning mode and the second mode is a straight traveling mode.

3. The robotic vehicle according to claim 1, wherein the initial turning indicator is obtained from a turning instruction to be executed by the robotic vehicle.

4. The robotic vehicle according to claim 1, wherein the robotic vehicle further comprises a sensor configured to communicate with the processing circuitry and obtain the initial turning indicator through detection of a turning indicator value.

5. The robotic vehicle according to claim 4, wherein the turning indicator configured to be detected by the sensor is the alignment of the first and second chassis platform in relation to each other and the turning indicator value is a change in an alignment value collected from said sensor.

6. The robotic vehicle according to claim 5, wherein the alignment value detected by the sensor is a change in turning angle about the turning axis of the second chassis platform in relation to the first chassis platform.

7. The robotic vehicle according to claim 1, wherein the robotic vehicle further comprises a gyroscope, and wherein the initial turning indicator is at least in part obtained from the gyroscope.

8. The robotic vehicle according to claim 1, wherein the processing circuitry is configured to adjust the steering of second wheel assembly to keep the robotic vehicle in the initial travelling direction.

9. The robotic vehicle according to claim 1, wherein the turning shaft is mounted to the second chassis platform via a pivot bearing configured to allow pivoting about a pivot axis substantially perpendicular to the turning axis.

10. The robotic vehicle according to claim 9, wherein the pivot bearing is a ball bearing.

11. The robotic vehicle according to claim 1, wherein the electric brake is configured to lock the rotation of the linkage by locking the rotation of the turning shaft and said electric brake further comprises a brake disc configured to engage the electric brake.

12. The robotic vehicle according to claim 11, wherein the electric brake comprises an electromagnet configured to engage the brake disc when applied.

13. The robotic vehicle according to claim 12, wherein the brake disk is a soft magnet.

14. The robotic vehicle according to claim 12, wherein response to the electromagnet being energized a magnetic field is reversed.

15. The robotic vehicle according to claim 12, wherein the brake disc is adapted to be connected to a guide rod allowing the brake disc to travel in response to the application of the electric brake, toward the electric brake, and in response the release of the electric brake, away from the electric brake.

16. The robotic vehicle according to claim 11, wherein the brake disc and electromagnet comprises an electropermanent magnet.

17. The robotic vehicle according to claim 1, wherein the electric brake is deenergized when applied and energized when released.

18. The robotic vehicle according to claim 1, wherein the robotic vehicle is an all wheel driven vehicle with articulated rear wheel steering.

19. A method for controlling a robotic vehicle having a first chassis platform and a second chassis platform being rotatable relative to the first chassis platform, and an electric brake, wherein said robotic vehicle is configured to operate in a first mode, wherein the electric brake is controlled to allow for rotation of the second chassis platform about the turning axis in order to change an actual turn angle of the robotic vehicle, and in a second mode, wherein the electric brake is controlled to prevent rotation of the second chassis platform about the turning axis in order to minimize self-steering and instability of the robotic vehicle after the actual turn angle of the robotic vehicle matches a desired turn angle, wherein the method comprises:
  detecting that the actual turn angle of the robotic vehicle differs from the desired turn angle of the robotic vehicle, and
  switching operating mode to correct self-steering by selecting the first mode and minimize self-steering and instability of the robotic vehicle by selecting the second mode.

20. The method according to claim 19, wherein the step of obtaining information of the initial turning indicator comprises obtaining the initial turning indicator from a turning instruction to be executed by the robotic vehicle and wherein the step of switching operating mode for the robotic vehicle comprises switching operating mode for the robotic vehicle from the second mode to the first mode when the initial turning indicator is obtained, whereby the method further comprises:
  switching operating mode for the robotic vehicle from the first mode to the second mode when the turning instruction has been executed.

21. The method according to claim 19, wherein the step of obtaining information of the initial turning indicator comprises obtaining the initial turning indicator through detection of a turning indicator value via a sensor and wherein the step of switching operating mode for the robotic vehicle comprises switching the operating mode for the robotic vehicle from the first mode to the second mode when the turning indicator value is above a turning indicator threshold value, whereby the method further comprises:
  switching the operating mode for the robotic vehicle from the second mode to the first mode after a period of time tswitch.

22. The method according to claim 21, wherein the turning indicator threshold value is a change in turning angle about the turning axis of the second chassis platform (210) in relation to the first chassis platform is between 1 and 10 degrees.

23. The method according to claim 21, wherein the time period tswitch is between 1 and 10 seconds.

* * * * *